(12) United States Patent
Xu et al.

(10) Patent No.: US 11,677,520 B2
(45) Date of Patent: *Jun. 13, 2023

(54) SEARCH SPACE DESIGN WITH OVERBOOKING IN CARRIER AGGREGATION

(71) Applicant: QUALCOMM Incorporated, San Diego, CA (US)

(72) Inventors: Huilin Xu, Temecula, CA (US); Heechoon Lee, San Diego, CA (US); Jing Sun, San Diego, CA (US); Peter Pui Lok Ang, San Diego, CA (US); Wanshi Chen, San Diego, CA (US); Joseph Binamira Soriaga, San Diego, CA (US); Peter Gaal, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/580,136

(22) Filed: Jan. 20, 2022

(65) Prior Publication Data

US 2022/0224468 A1 Jul. 14, 2022

Related U.S. Application Data

(63) Continuation of application No. 16/406,265, filed on May 8, 2019, now Pat. No. 11,233,610.

(Continued)

(51) Int. Cl.
*H04L 5/00* (2006.01)

(52) U.S. Cl.
CPC ............ *H04L 5/0042* (2013.01); *H04L 5/001* (2013.01)

(58) Field of Classification Search
CPC ..... H04L 5/0042; H04L 5/001; H04L 5/0053; H04L 27/26025
See application file for complete search history.

(56) References Cited

U.S. PATENT DOCUMENTS 11,233,610 B2 1/2022 Xu et al.
2013/0155868 A1 6/2013 Seo et al.
(Continued)

FOREIGN PATENT DOCUMENTS

EP 2512051 A2 10/2012
WO WO-2013002471 A1 * 1/2013 ........... H04L 1/0045
(Continued)

OTHER PUBLICATIONS

Ericsson: "On Remaining Issues of Search Spaces", 3GPP TSG RAN WG1 Meeting #92bis, 3GPP Draft; R1-1805178, 3rd Generation Partnership Project (3GPP), Mobile Competence Centre; 650, Route Des Lucioles; F-06921 Sophia-Antipolis Cedex ; France, vol. RAN WG1, No. Sanya, China; Apr. 16, 2018-Apr. 20, 2018, Apr. 15, 2018 (Apr. 15, 2018), 13 Pages, XP051427427, Retrieved from the Internet: URL: http://www.3gpp.org/ftp/Meetings%5F3GPP%5FSYNC/RAN1/Docs/ [retrieved on Apr. 15, 2018] pp. 3-6, 12.
(Continued)

*Primary Examiner* — Rina C Pancholi
(74) *Attorney, Agent, or Firm* — Holland & Hart LLP

(57) ABSTRACT

Methods, systems, and devices for wireless communications are described that provide for allocation of control channel candidates for multiple component carriers (CCs) in carrier aggregation (CA) communications. A CA limit may correspond to a total number of configurable control channel candidates across multiple CCs. The control channel candidates may include blind decoding (BD) candidates or control channel element (CCE) candidates for channel estimation. A per-CC limit of control channel candidates may correspond to a number of configurable control channel candidates for (Continued)

each CC. An applied set of control channel candidates may be determined by allocating control channel candidates across the multiple CCs based on the CA limit and the per-CC limit. Such techniques may be used in cases where the CCs have a same numerology or mixed numerology, and may also be used for cross-carrier scheduling.

30 Claims, 14 Drawing Sheets

Related U.S. Application Data

(60) Provisional application No. 62/670,661, filed on May 11, 2018.

(56) References Cited

U.S. PATENT DOCUMENTS

| | | | |
|---|---|---|---|
| 2019/0223164 A1 | 7/2019 | He et al. | |
| 2019/0313321 A1* | 10/2019 | Xu | H04L 5/0053 |
| 2021/0058189 A1 | 2/2021 | Xiao et al. | |

FOREIGN PATENT DOCUMENTS

| | | | |
|---|---|---|---|
| WO | WO2013131268 A1 | 9/2013 | |
| WO | WO-2021203284 A1 * | 10/2021 | H04L 5/001 |

OTHER PUBLICATIONS

Ericsson: "On Search Space and Blind Decoding Design", 3GPP TSG RAN WG1 NR Ad-Hoc#2, 3GPP Draft; R1-1711480, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017, Jun. 26, 2017 (Jun. 26, 2017), pp. 1-4, XP051300665, Retrieved from the Internet: URL: http://www.3gpp.org/ftp/Meetings_3GPP_SYNC/RAN1/Docs/ [retrieved on Jun. 26, 2017] pp. 3,4.
International Preliminary Report on Patentability—PCT/US2019/031603, The International Bureau of WIPO—Geneva, Switzerland, dated Nov. 26, 2020.
International Search Report and Written Opinion—PCT/US2019/031603—ISA/EPO—dated Aug. 6, 2019.

* cited by examiner

SEARCH SPACE DESIGN WITH OVERBOOKING IN CARRIER AGGREGATION

CROSS REFERENCES

The present Application for Patent is a Continuation of U.S. patent application Ser. No. 16/406,265 by XU et al., entitled "Search Space Design With Overbooking in Carrier Aggregation" filed May 8, 2019, which claims the benefit of U.S. Provisional Application No. 62/670,661 by Xu et al., entitled "Search Space Design with Overbooking In Carrier Aggregation," filed May 11, 2018, assigned to the assignee hereof, and expressly incorporated by reference herein in its entirety.

BACKGROUND

The following relates generally to wireless communications, and more specifically to search space design with overbooking in carrier aggregation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, such as those having multiple possible control channel configurations and/or multiple possible overlapping monitoring occasions, search space configurations may allow overbooking of decoding candidates. For example, overbooking may refer to configuring more blind decoding candidates than a UE may be capable of processing. Additionally or alternatively, overbooking may refer to search spaces that span an amount of resources that exceeds a UE capability for performing channel estimation. Further, some wireless communications systems may use carrier aggregation techniques in which multiple different component carriers (CCs) may be used for wireless transmissions, and overbooking of search spaces across multiple CCs may occur. Overbooking of search spaces may present challenges in scheduling and monitoring for downlink control information.

SUMMARY

The described techniques relate to improved methods, systems, devices, or apparatuses that support search space design with overbooking in carrier aggregation. In some cases, due to blind decoding (BD) and control channel element (CCE) channel estimation (CE) limitations, some control channel candidates (e.g., Physical Downlink Control Channel (PDCCH) candidates) of one or more search space sets may need to be dropped (or pruned) for blind decoding and/or CE purposes. Various aspects of the present disclosure provide for allocation of control channel candidates for multiple component carriers (CCs) in carrier aggregation (CA) communications. In some cases, a CA limit may correspond to a total number of configurable control channel candidates across multiple CCs. The control channel candidates may include blind decoding (BD) candidates or control channel element (CCE) candidates for channel estimation. A per-CC limit of control channel candidates may correspond to a number of configurable control channel candidates for each CC. An applied set of control channel candidates may be determined by allocating control channel candidates across the multiple CCs based on the CA limit and the per-CC limit. Such techniques may be used in cases where the CCs have a same numerology or mixed numerology, and may also be used for cross-carrier scheduling.

A method of wireless communication is described. The method may include establishing a wireless connection via a set of CCs using CA, determining a CA limit corresponding to a total number of configurable control channel candidates across the set of CCs, the control channel candidates including BD candidates or CCE candidates for channel estimation, determining a per-CC limit corresponding to a per-CC number of control channel candidates that are configurable for each CC of the set of CCs, determining an applied set of control channel candidates by allocating control channel candidates across a number of configured control channel candidates of the set of CCs based on the CA limit and the per-CC limit, where the number of configured control channel candidates for at least one CC of the set of CCs may exceed the per-CC limit, and communicating based on the applied set of control channel candidates.

An apparatus for wireless communication is described. The apparatus may include a processor, memory in electronic communication with the processor, and instructions stored in the memory. The instructions may be executable by the processor to cause the apparatus to establish a wireless connection via a set of CCs using CA, determine a CA limit corresponding to a total number of configurable control channel candidates across the set of CCs, the control channel candidates including BD candidates or CCE candidates for channel estimation, determine a per-CC limit corresponding to a per-CC number of control channel candidates that are configurable for each CC of the set of CCs, determine an applied set of control channel candidates by allocating control channel candidates across a number of configured control channel candidates of the set of CCs based on the CA limit and the per-CC limit, where the number of configured control channel candidates for at least one of the CCs may exceed the per-CC limit, and communicate based on the applied set of control channel candidates.

Another apparatus for wireless communication is described. The apparatus may include means for establishing a wireless connection via a set of CCs using CA, determining a CA limit corresponding to a total number of configurable control channel candidates across the set of CCs, the control channel candidates including BD candidates or CCE candidates for channel estimation, determining a per-CC limit corresponding to a per-CC number of control channel candidates that are configurable for each CC of the set of CCs, determining an applied set of control channel candidates by allocating control channel candidates across a number of configured control channel candidates of the set of CCs based on the CA limit and the per-CC limit, where the number of configured control channel candidates for at least one of the CCs may exceed the per-CC limit, and communicating based on the applied set of control channel candidates.

A non-transitory computer-readable medium storing code for wireless communication is described. The code may include instructions executable by a processor to establish a wireless connection via a set of CCs using CA, determine a CA limit corresponding to a total number of configurable control channel candidates across the set of CCs, the control channel candidates including BD candidates or CCE candidates for channel estimation, determine a per-CC limit corresponding to a per-CC number of control channel candidates that are configurable for each CC of the set of CCs, determine an applied set of control channel candidates by allocating control channel candidates across a number of configured control channel candidates of the set of CCs based on the CA limit and the per-CC limit, where the number of configured control channel candidates for at least one of the CCs may exceed the per-CC limit, and communicate based on the applied set of control channel candidates.

In some examples of the method, apparatuses, and non-transitory computer-readable medium described herein, the determining the applied set of control channel candidates may include operations, features, means, or instructions for allocating control channel candidates separately for each CC of the set of CCs, the control channel candidates for each CC allocated to comply with the per-CC limit. In some examples of the method, apparatuses, and non-transitory computer-readable medium described herein, a UE may be capable of supporting a first number of CCs, and where a second number of CCs in the set of CCs may be less than or equal to the first number of CCs, and where the control channel candidates for each CC may be separately allocated to each comply with the per-CC limit.

In some examples of the method, apparatuses, and non-transitory computer-readable medium described herein, a UE may be capable of supporting a first number of CCs, and where a second number of CCs in the set of CCs may be greater than the first number of CCs. In some examples of the method, apparatuses, and non-transitory computer-readable medium described herein, the determining the applied set of control channel candidates may include operations, features, means, or instructions for selecting a subset of CCs from the set of CCs, the subset of CCs having a third number of CCs corresponding to the first number of CCs and allocating control channel candidates across the subset of CCs, where the control channel candidates for each CC of the subset of CCs may be separately allocated to each comply with the per-CC limit.

In some examples of the method, apparatuses, and non-transitory computer-readable medium described herein, the per-CC limit for each CC of the set of CCs may be defined by a set of non-negative numbers such that the per-CC limit may be a product of a selected non-negative number, the first number of CCs, and a single carrier limit of control channel candidates that may be configurable for a single non-CA carrier, and where the selected non-negative number may be based on whether a BD limit budget or a CCE limit budget may be distributed evenly, proportional to a bandwidth, or proportional to configured control channel candidates, for each CC. In some examples of the method, apparatuses, and non-transitory computer-readable medium described herein, a sum of the set of non-negative numbers selected for each CC of the set of CCs equals one. In some examples of the method, apparatuses, and non-transitory computer-readable medium described herein, each non-negative number may be less than or equal to one divided by the first number of CCs.

In some examples of the method, apparatuses, and non-transitory computer-readable medium described herein, the determining the applied set of control channel candidates may include operations, features, means, or instructions for distributing a BD limit budget or a CCE limit budget evenly across the second number of CCs, where a portion of the BD limit budget or the CCE limit budget for each CC corresponds to a product of the first number of CCs and the per-CC limit divided by the second number of CCs. In some examples of the method, apparatuses, and non-transitory computer-readable medium described herein, the determining the applied set of control channel candidates may include operations, features, means, or instructions for distributing a BD limit budget or a CCE limit budget across the second number of CCs according to a bandwidth-proportional distribution, where a portion of the BD limit budget or the CCE limit budget for each CC corresponds to a product of the first number of CCs, the per-CC limit, and a bandwidth of the associated CC, divided by a total cumulative bandwidth of the second number of CCs. Some examples of the method, apparatuses, and non-transitory computer-readable medium described herein the bandwidth of the associated CC corresponds to a bandwidth of a number of control resource sets (CORESETs), an active bandwidth part (BWP), or a cell bandwidth of the associated CC.

In some examples of the method, apparatuses, and non-transitory computer-readable medium described herein, the determining the applied set of control channel candidates may include operations, features, means, or instructions for distributing a BD limit budget or a CCE limit budget across the second number of CCs according to a slot-based proportional distribution, where a portion of the BD limit budget or the CCE limit budget for each CC corresponds to a product of the first number of CCs, the per-CC limit, and a number of BDs or CCEs associated with the configured control channel candidates of the associated CC for an associated slot, divided by a total cumulative number of configured control channel candidates of the second number of CCs.

In some examples of the method, apparatuses, and non-transitory computer-readable medium described herein, the determining the applied set of control channel candidates may include operations, features, means, or instructions for reducing a number of CCs of the set of CCs that can be scheduled with control channel transmissions to correspond to the second number of CCs, and distributing a BD limit budget or a CCE limit budget across configured control channel candidates of the reduced number of CCs; or and maintaining the per-CC limit for a first subset of CCs and distributing remaining of the CA limit control channel candidates among remaining CCs of the set of CCs.

In some examples of the method, apparatuses, and non-transitory computer-readable medium described herein, the determining the applied set of control channel candidates may include operations, features, means, or instructions for identifying a set of search space (SS) sets that indicate, for each CC of the set of CCs, associated resources for available control channel candidates and mapping the set of SS sets of each CC of the set of CCs up to the per-CC limit to determine the applied set of control channel candidates for the corresponding CC, where each CC of the set of CCs may have an ordered CC index, and where the mapping may be from a lowest CC index to a highest CC index.

In some examples of the method, apparatuses, and non-transitory computer-readable medium described herein, the determining the applied set of control channel candidates may include operations, features, means, or instructions for identifying a set of SS sets that each indicate associated resources for available control channel candidates for two or more CCs, where each CC set may have a SS set index and mapping the each CC associated with each SS set to determine the applied set of control channel candidates for the corresponding SS set, where a control channel candidate for a CC may be skipped if the per-CC limit for the corresponding CC may be reached or the CC may be fully mapped, and where the mapping may be from a lowest SS index to a highest SS index.

In some examples of the method, apparatuses, and non-transitory computer-readable medium described herein, a UE may be capable of supporting a first number of CCs, and where a second number of CCs in the set of CCs may be greater than the first number of CCs, and where the determining the applied set of control channel candidates may include operations, features, means, or instructions for allocating control channel candidates jointly for the set of CCs, the control channel candidates for each CC allocated to comply with the per-CC limit and the CA limit. In some examples of the method, apparatuses, and non-transitory computer-readable medium described herein, the allocating the control channel candidates may include operations, features, means, or instructions for identifying a set of SS sets that indicate, for each CC of the set of CCs, associated resources for available control channel candidates, mapping the set of SS sets of each CC of the set of CCs up to the per-CC limit to determine the applied set of control channel candidates for the corresponding CC, where each CC of the set of CCs may have an ordered CC index, and where the mapping may be from a lowest CC index to a highest CC index, maintaining a cumulative count of mapped control channel candidates across the set of CCs and stopping the mapping if the cumulative count reaches the CA limit. In some examples of the method, apparatuses, and non-transitory computer-readable medium described herein, the allocating the control channel candidates may include operations, features, means, or instructions for identifying set of SS sets that each indicate associated resources for available control channel candidates for two or more CCs, where each CC set may have a SS set index, mapping the each CC associated with each SS set to determine the applied set of control channel candidates for the corresponding SS set, where a control channel candidate for a CC may be skipped if the per-CC limit for the corresponding CC may be reached or the CC may be fully mapped, and where the mapping may be from a lowest SS index to a highest SS index, maintaining a cumulative count of mapped control channel candidates across the set of SS sets and stopping the mapping if the cumulative count reaches the CA limit. In some examples of the method, apparatuses, and non-transitory computer-readable medium described herein, a number of CCs of the set of CCs that can be scheduled with control channel candidates may be unknown until the allocating may be finished.

In some examples of the method, apparatuses, and non-transitory computer-readable medium described herein, the set of CCs includes at least a first CC having a first SCS and a second CC having a second SCS that may be different than the first SCS. In some examples of the method, apparatuses, and non-transitory computer-readable medium described herein, the first CC may be a scheduling CC that provides scheduling information for each of the CCs of the set of CCs, and where the first SCS may be used in determining the CA limit for the scheduling CC and each of the CCs of the set of CCs that is provided scheduling information. In some examples of the method, apparatuses, and non-transitory computer-readable medium described herein, the first CC may be a scheduling CC that provides scheduling information for the second CC, and where the first SCS may be used for the second CC for determining the applied set of control channel candidates.

In some examples of the method, apparatuses, and non-transitory computer-readable medium described herein, the determining the applied set of control channel candidates may include operations, features, means, or instructions for allocating a BD limit budget or a CCE limit budget separately for each CC of the set of CCs based on control channel candidates for each CC that may be allocated to comply with the per-CC limit.

In some examples of the method, apparatuses, and non-transitory computer-readable medium described herein, a UE may be capable of supporting a first number of CCs, and where a second number of CCs in the set of CCs may be greater than the first number of CCs, and where the determining the applied set of control channel candidates may include operations, features, means, or instructions for identifying the first SCS as a reference SCS and identifying a reference slot duration based on the reference SCS, determining a second slot duration of the second CC based on the second SCS, determining the per-CC limit of the second CC based on the second slot duration relative to the reference slot duration and allocating control channel candidates jointly for the set of CCs, the control channel candidates for each CC allocated to comply with the per-CC limit and the CA limit.

In some examples of the method, apparatuses, and non-transitory computer-readable medium described herein, the allocating the control channel candidates may include operations, features, means, or instructions for counting a number of control channel candidates for each reference slot duration for each CC, calculating a total number of control channel candidates for each CC in the reference slot duration and allocating a set of BDs or CCEs to a total number control channel candidates for each CC to comply with the per-CC limit and the CA limit.

In some examples of the method, apparatuses, and non-transitory computer-readable medium described herein, the allocating the control channel candidates further may include operations, features, means, or instructions for identifying a set of SS sets that indicate, for each CC of the set of CCs, associated resources for available control channel candidates, mapping the set of SS sets of each CC of the set of CCs up to the per-CC limit to determine the applied set of control channel candidates for the corresponding CC, where each CC of the set of CCs may have an ordered CC index, and where the mapping may be from a lowest CC index to a highest CC index, maintaining a cumulative count of mapped control channel candidates across the set of CCs and stopping the mapping if the cumulative count reaches the CA limit.

In some examples of the method, apparatuses, and non-transitory computer-readable medium described herein, the allocating the control channel candidates further may include operations, features, means, or instructions for identifying set of SS sets that each indicate associated resources for available control channel candidates for two or more CCs, where each CC set may have a SS set index, mapping the each CC associated with each SS set to determine the applied set of control channel candidates for the corresponding SS set, where a control channel candidate for a CC may be skipped if the per-CC limit for the corresponding CC may be reached or the CC may be fully mapped, and where the mapping may be from a lowest SS index to a highest SS index, maintaining a cumulative count of mapped control channel candidates across the set of SS sets and stopping the mapping if the cumulative count reaches the CA limit. In some examples of the method, apparatuses, and non-transitory computer-readable medium described herein, a smallest SCS of the first SCS and the second SCS may be selected as the reference SCS.

In some examples of the method, apparatuses, and non-transitory computer-readable medium described herein, the first SCS may be smaller than the second SCS, the second SCS may be the reference SCS, and first slot duration of the first CC may be longer than the reference slot duration, and where the total number of control channel candidates for each CC in the reference slot duration may be adjusted based a portion of the first slot duration that overlaps with a subsequent reference slot duration.

A method of wireless communication is described. The method may include establishing a wireless connection via two or more CCs using CA, identifying a first subset of the two or more CCs in which configured control channel candidates may exceed a per-CC limit of control channel candidates for each CC, the control channel candidates corresponding to locations for control channel processing objects for BD or CCEs for channel estimation, identifying a second subset of the two or more CCs in which the number of configured control channel candidates comply with the per-CC limit of control channel candidates for each CC, determining an applied set of control channel candidates for the first subset of two or more CCs by mapping control channel candidates across the first subset of two or more CCs such that mapped control channel candidates comply with the per-CC limit, and communicating based on the applied set of control channel candidates.

An apparatus for wireless communication is described. The apparatus may include a processor, memory in electronic communication with the processor, and instructions stored in the memory. The instructions may be executable by the processor to cause the apparatus to establish a wireless connection via two or more CCs using CA, identify a first subset of the two or more CCs in which configured control channel candidates may exceed a per-CC limit of control channel candidates for each CC, the control channel candidates corresponding to locations for control channel processing objects for BD or CCEs for channel estimation, identify a second subset of the two or more CCs in which the number of configured control channel candidates comply with the per-CC limit of control channel candidates for each CC, determine an applied set of control channel candidates for the first subset of CCs by mapping control channel candidates across the first subset of CCs such that mapped control channel candidates comply with the per-CC limit, and communicate based on the applied set of control channel candidates.

Another apparatus for wireless communication is described. The apparatus may include means for establishing a wireless connection via two or more CCs using CA, identifying a first subset of the two or more CCs in which configured control channel candidates may exceed a per-CC limit of control channel candidates for each CC, the control channel candidates corresponding to locations for control channel processing objects for BD or CCEs for channel estimation, identifying a second subset of the two or more CCs in which the number of configured control channel candidates comply with the per-CC limit of control channel candidates for each CC, determining an applied set of control channel candidates for the first subset of CCs by mapping control channel candidates across the first subset of CCs such that mapped control channel candidates comply with the per-CC limit, and communicating based on the applied set of control channel candidates.

A non-transitory computer-readable medium storing code for wireless communication is described. The code may include instructions executable by a processor to establish a wireless connection via two or more CCs using CA, identify a first subset of the two or more CCs in which configured control channel candidates may exceed a per-CC limit of control channel candidates for each CC, the control channel candidates corresponding to locations for control channel processing objects for BD or CCEs for channel estimation, identify a second subset of the two or more CCs in which the number of configured control channel candidates comply with the per-CC limit of control channel candidates for each CC, determine an applied set of control channel candidates for the first subset of CCs by mapping control channel candidates across the first subset of CCs such that mapped control channel candidates comply with the per-CC limit, and communicate based on the applied set of control channel candidates.

In some examples of the method, apparatuses, and non-transitory computer-readable medium described herein, the number of configured control channel candidates complies with a per-CA limit of control channel candidates for the two or more CCs.

In some examples of the method, apparatuses, and non-transitory computer-readable medium described herein, the first subset of the two or more CCs includes a primary component carrier (PCC), a primary secondary component carrier (PSCC) and the second subset of the two or more CCs includes one or more secondary component carriers (SCCs). In some examples of the method, apparatuses, and non-transitory computer-readable medium described herein, the two or more CCs includes at least a first CC having a first sub-carrier spacing (SCS), and a primary secondary component carrier (PSCC) and a second CC having a second SCS that may be different than the first SCS.

DETAILED DESCRIPTION

Figure 1:
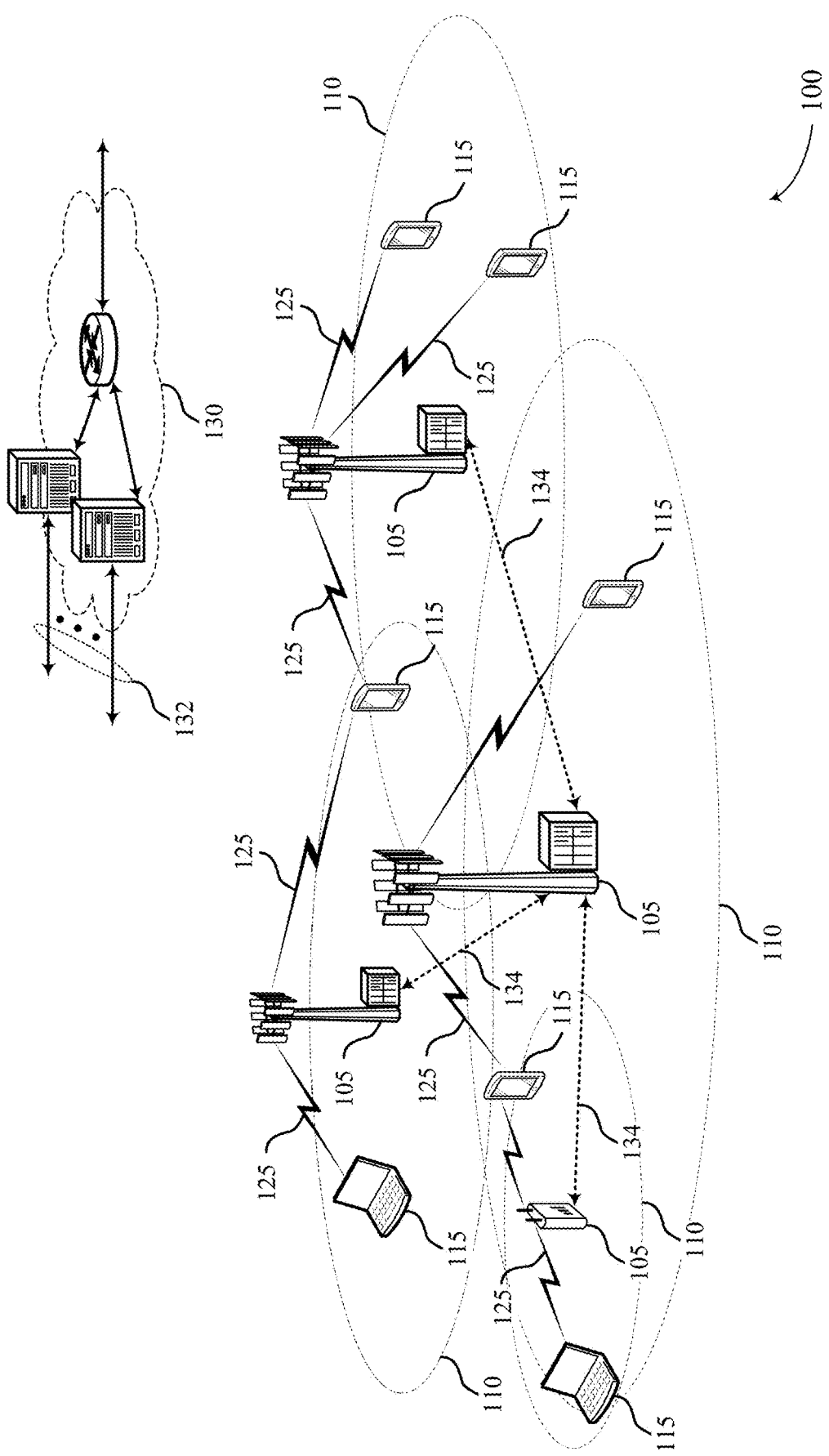
FIG. 1 illustrates an example of a system for wireless communications in accordance with aspects of the present disclosure.

Various described techniques provide search space design with overbooking in carrier aggregation (CA), in which control channel candidates may be allocated across component carriers (CCs) such that a per-CC limit and CA limit on the number of blind decodes or channel estimations to be performed by a user equipment (UE) are within the UE capability. Such techniques may be used in wireless communications systems in which a base station may transmit downlink control information (DCI) to a UE or a group of UEs. The UEs may use the DCI to support communications with the base station. The base station may configure search space sets according to control channel candidates (e.g., Physical Downlink Control Channel (PDCCH) candidates) at one or more aggregation levels to use for these DCI transmissions. When configuring a search space set, the base station may determine a control resource set (CORESET) containing the search space set. This CORESET may include a number of control channel elements (CCEs) and the search space set may be mapped to a CCE space corresponding to a subset of CCEs of the CORESET. The UEs may identify this search space set configuration, and may monitor the CCEs corresponding to the control channel candidates for any DCI transmissions from the base station. A control region may be a search space monitoring occasion for one or more search space sets that has a common reference signal configuration (e.g., shares a scrambling sequence, etc.).

As indicated above, in some cases, due to blind decoding (BD) and CCE channel estimation limitations, some control channel candidates (e.g., PDCCH candidates) of one or more search space sets may need to be dropped (or pruned) for blind decoding and/or CE purposes. Various aspects of the present disclosure provide for allocation of control channel candidates for multiple component carriers (CCs) in carrier aggregation (CA) communications. In some cases, a CA limit may correspond to a total number of configurable control channel candidates across multiple CCs. The control channel candidates may include blind decoding (BD) candidates or control channel element (CCE) candidates for channel estimation. A per-CC limit of control channel candidates may correspond to a number of configurable control channel candidates for each CC. An applied set of control channel candidates may be determined by allocating control channel candidates across the multiple CCs based on the CA limit and the per-CC limit. Such techniques may be used in cases where the CCs have a same numerology or mixed numerology, and may also be used for cross-carrier scheduling.

In some cases, the per-CC limit may be applied to each configured CC. In cases where a UE is capable of supporting all of the configured CCs, complying with the per-CC limit will also result in compliance with the CA limit, and control channel candidates may be allocated for each CC in accordance with the per-CC limit. In cases where a user equipment (UE) is capable of supporting fewer CCs than are configured, however, the per-CC limit may result in more control channel candidates that the UE is capable of handling. In such cases, the per-CC limit for one or more of the CCs may be adjusted such that the CA limit is met.

Aspects of the disclosure are initially described in the context of a wireless communications system. Various examples of allocations and mappings across multiple CCs are then discussed. Aspects of the disclosure are further illustrated by and described with reference to apparatus diagrams, system diagrams, and flowcharts that relate to search space design with overbooking in carrier aggregation.

FIG. 1 illustrates an example of a wireless communications system 100 that supports search space design with overbooking in carrier aggregation in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a base station 105 may configure a UE 115 with a set of CCEs of a control channel within a time duration, such as a slot. Additionally, the base station 105 may configure a plurality of search space set occasions, the plurality of search space set occasions associated with one or more search space sets comprising sets of control channel candidates for BD or CCEs for channel estimation. In some cases, due to BD and CCE channel estimation limitations, some control channel candidates (e.g., PDCCH candidates) of one or more search space sets may be dropped or pruned for blind decoding and/or CE purposes. Further, when operating in CA mode, a CA limit may correspond to a total number of configurable control channel candidates across multiple CCs. A per-CC limit of control channel candidates may correspond to a number of configurable control channel candidates for each CC. An applied set of control channel candidates may be determined by allocating control channel candidates across the multiple CCs based on the CA limit and the per-CC limit. Such techniques may be used in cases where the CCs have a same numerology or mixed numerology, and may also be used for cross-carrier scheduling.

Figure 2:
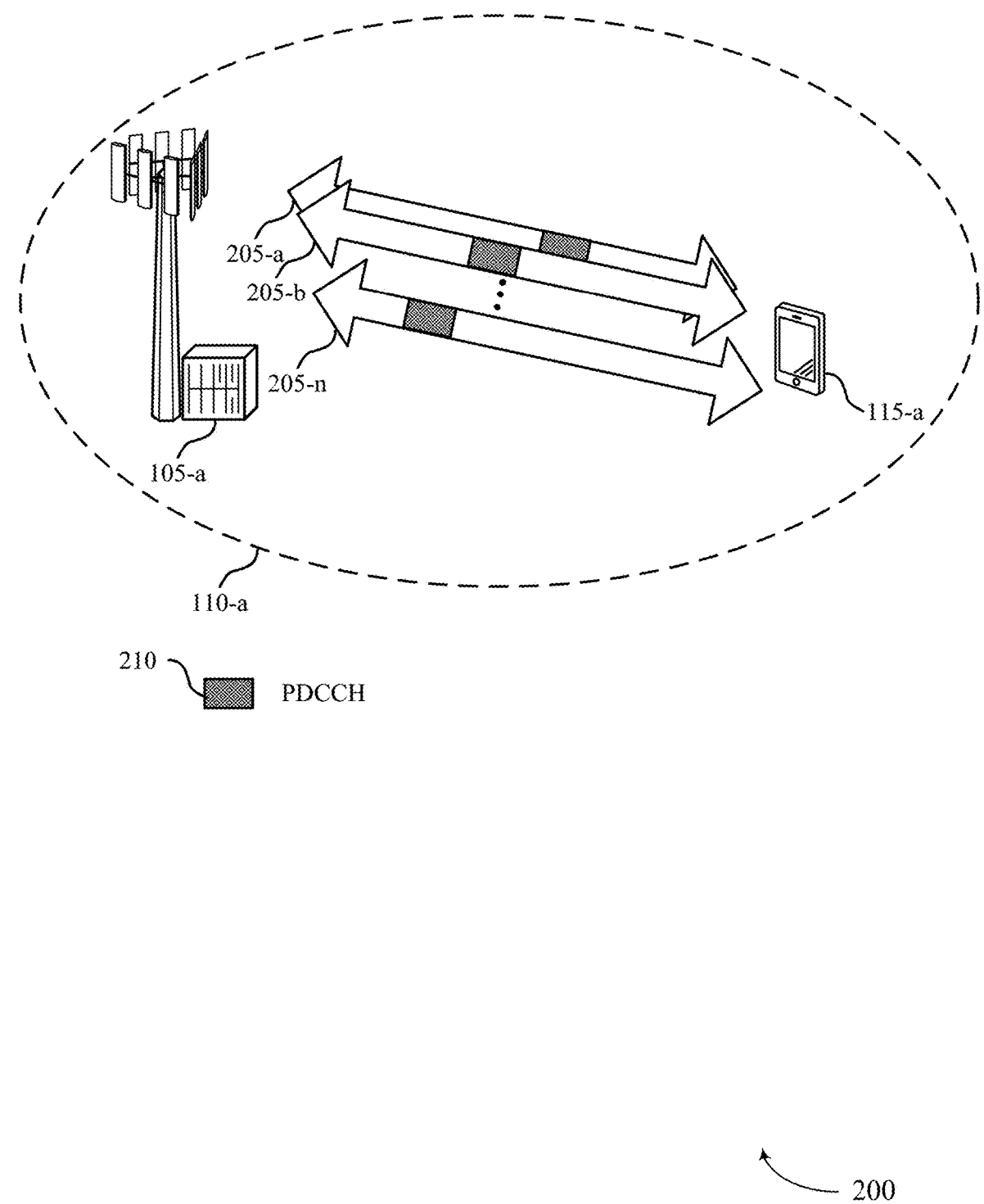
FIG. 2 illustrates an example of a portion of a wireless communications system in accordance with aspects of the present disclosure.

FIG. 2 illustrates an example of a wireless communications system 200 that supports search space design with overbooking in carrier aggregation in accordance with aspects of the present disclosure. In some examples, wireless communications system 200 may implement aspects of wireless communications system 100. Wireless communications system 200 may include base station 105-a and UE 115-a, which may be examples of a base station 105 and a UE 115 described with reference to FIG. 1. In some examples, base station 105-a may be in communication with one or more UEs 115 within geographic coverage area 110-a. In this example, wireless communications system 200 may support carrier aggregation, and base station 105-a may communicate with UE 115-a on resources of multiple component carriers 205, including a first component carrier 205-a, a second component carrier 205-b, through an n-th component carrier 205-n.

As indicated above, various aspects of the present disclosure provide techniques for search space design with overbooking in CA, in which control channel candidates may be allocated across CCs 205 such that a per-CC limit and CA limit on the number of blind decodes or channel estimations to be performed by the UE 115-a are within its capability. The base station 105-a may configure search space sets according to control channel candidates (e.g., Physical Downlink Control Channel (PDCCH) 210 candidates) at one or more aggregation levels to use for these DCI transmissions. When configuring a search space set, the base station may determine a control resource set (CORESET) containing the search space set. This CORESET may include a number of control channel elements (CCEs) and the search space set may be mapped to a CCE space corresponding to a subset of CCEs of the CORESET. The UE 115-a may identify this search space set configuration, and may monitor the CCEs corresponding to the control channel candidates for any DCI transmissions from the base station 105-a. A control region may be a search space monitoring occasion for one or more search space sets that has a common reference signal configuration (e.g., shares a scrambling sequence, etc.). The control channel candidates may correspond to locations for control channel processing objects for BD or CCEs for channel estimation.

As discussed above, in some cases, due to BD and CCE channel estimation limitations, some control channel candidates (e.g., PDCCH 210 candidates) of one or more search space sets may need to be dropped or pruned for blind decoding and/or CE purposes. When using CA, the UE 115-a may be configured with a number of CCs 205. In some cases, the UE 115-a may support CA with up to four downlink CCs 205 with the same numerology, thus providing a maximum number of PDCCH 210 blind decodes per slot of the UE shall support is a product of the maximum number of CCs (e.g., 4) and a number of configurable control channel candidates for BD. Similar maximums may apply to CCEs for channel estimation. In some cases, the number of configurable control channel candidates may be defined based on a sub-carrier spacing (SCS) of a CC 205 (e.g., {44, 36, 22, 20} for SCS={15 kHz, 30 kHz, 60 kHz, 120 kHz} for BD, and {56, 56, 48, 32} for SCS={15 kHz, 30 kHz, 60 kHz, 120 kHz} for CCE). In some cases, the UE 115-a may be capable of supporting more than four CCs 205, up to Y CCs of the same numerology, and such a UE 115-a may support a maximum number of PDCCH blind decodes that is a product of Y and a number of configurable control channel candidates. In some cases, the value of Y is an integer and may be reported as a UE capability to the network. As discussed above, overbooking may allow more configurable control channel candidates than the UE 115-a can support, and candidates within search space (SS) sets may be mapped to meet the UE 115-a capability. If all candidates in a SS set are not able to be mapped, candidates in the SS set and in any subsequent SS sets may be dropped and not mapped. In some cases, mapping rules may be established between the UE 115-a and the base station 105-a such that the same candidates are identified. Additionally, a maximum number of CORESETs per bandwidth part (BWP) may be defined (e.g., 3), and in some cases, a maximum of 10 search space sets per BWP per cell may be defined.

In some cases, the UE 115-a may be configured with a search space configuration by UE-specific RRC signaling which includes following: CORESET ID (range: 0-11, to indicate which CORESET the search space is mapped to), wherein the search space can be associated with any CORESET configuration, and in some cases when the CORSET ID is UE-specifically configured to be 0 it is mapped to the one configured by PBCH; and a search space ID (range: 0-39), and in some cases, when the search space ID is UE-specifically configured to be 0 it is mapped to the one configured by PBCH.

When multiple CCs 205 are configured, as indicated above, the total number of BD/CCE, which may correspond to a total number of control channel candidates, for of all CCs 205 should not exceed a CA limit. Further, the number of BD/CCE per scheduled CC 205 should not exceed the single carrier limit, thus a per-CC limit may be identified as a limit based on a single carrier. In some cases, for cross-carrier scheduling, a lump sum of BD/CCE per CC limit may be assigned to the scheduling CC, as will be discussed in more detail below. In some cases, there is no overbooking for a common search space (CSS), and thus overbooking techniques may be applied to UE-specific search spaces (UESS).

As indicated, a per-CC limit may be defined, as well as a CA limit. In some cases, if the number of BD/CCE for any scheduled CC 205 does not exceed the single carrier per-CC limit, the CA limit will also be satisfied. Then, CA overbooking handling simply becomes the single carrier overbooking handling of each CC based on corresponding single carrier limit. Thus, in cases where the scheduled CCs 205 are less than or equal to four, or greater than four but less than or equal to the UE 115-a capability, CA overbooking may be handled on a per-CC basis. In the other cases, the number of scheduled CCs 205 may exceed the UE 115-a capability, and thus satisfying the single carrier per-CC limit on all CCs 205 does not necessarily result in the CA limit being satisfied, and various techniques as discussed herein may allocate control channel candidates across the scheduled CCs 205 to comply with the per-CC limit and the CA limit. In some cases, such overbooking handling may include reducing the number of CCs 205 that may be used for PDCCH 210 scheduling to be less than or equal to the UE 115-a capability, or less than or equal to four. In other cases, the per-CC limit may be reduced such that it is smaller than the single carrier limit and such that a summation of the reduced per-CC limits is no larger than CA limit.

In some cases, the base station 105-a and UE 115-a may perform overbooking handling for each CC 205 separately based on the per-CC limit and, as long as per-CC limit is satisfied, the CA limit is satisfied, which may be referred to as independent overbooking handling. In other cases, the base station 105-a and UE 115-a may perform overbooking handling for each CC 205 based on single carrier limit and CA limit, which may be referred to as joint overbooking handling.

In cases that use independent overbooking handling, a number of CCs 205 that are configured by network may be referred to as K, a UE capability for the number of CCs may be referred to as M, a single carrier limit for BE or CCE may be X, and a bandwidth of each CC c may be $BW_c$. In some cases, the bandwidth may be the CORESET bandwidth of one or multiple CORESETs configured to the BWP, active BWP bandwidth, or cell bandwidth. In such cases, the BD or CCE number of the configured PDCCHs 210 on a CC c is $x_c$. As mentioned above, in cases where K is less than four or less than M, the per-CC limit may be utilized for each CC 205. In cases, where K is greater than M, the CA limit may be distributed among the CCs 205 to provide that the CA limit is not exceeded. Table 1 and Table 2 below provide a number of exemplary distribution techniques. In any of the cases where the CA limit is distributed, the UE 115-a and base station 105-a can optionally first reduce the number of CCs 205 that can be scheduled with PDCCH 210, then distribute CA limit among CCs, or keep per per-CC limit the same as single carrier limit for some CCs (e.g., a primary cell (PCell) or primary secondary cell (PSCell)), and distribute the remaining limit among the other CCs.

TABLE 1

Independent Overbooking Handling

| Number of CCs | Number of CCs scheduled with PDCCH | Per CC limit $\hat{X}_c$ for CC c | Note |
|---|---|---|---|
| K ≤ 4 | K | $\hat{X}_c = X$ | |
| 4 < K ≤ M | K | $\hat{X}_c = X$ | |
| K > M | M | $\hat{X}_c = X$ | Number of CCs that are mapped with PDCCH corresponds to (e.g., is limited by) UE capability for PDCCH. |
| | K | $\hat{X}_c = \dfrac{M \cdot X}{K}$ | Even distribution. |
| | K | $\hat{X}_c = \dfrac{M \cdot X \cdot BW_c}{\sum_{n=0}^{K-1} BW_n}$ | BW proportional distribution. |
| | K | $\hat{X}_c = \dfrac{M \cdot X \cdot x_c}{\sum_{n=0}^{K-1} x_n}$ | Configuration proportional distribution, distribution changes from slot to slot |

Such techniques for provide a number of options for distribute the CA limit of BD or CCE among CCs 205 so that the total number of BD or CCE does not exceed the CA limit as long as each CC 205 does not exceed the per-CC limit. In cases where K>M options may be generalized by the below formula where the per-CC limit for CC c can be defined by a set of non-negative numbers $a_c$, c=0, 1 . . . , K−1

$$\hat{X}_c = a_c \cdot M \cdot X.$$

In some cases, the set of non-negative numbers $a_c$, c=0, 1 . . . , K−1 satisfies the condition that $\sum_{c=0}^{K-a} a_c = 1$. Additionally, in some cases, the set of non-negative numbers $a_c$, c=0, 1 . . . , K−1 optionally satisfies the additional contention $a_c \leq 1/M$ for any c. Table 2 provides, for such cases, $\hat{X}_c$ for various values of $a_c$ in accordance with the above equation.

TABLE 2

Independent Overbooking Handling

| Number of CCs | Number of CCs scheduled with PDCCH | Per CC limit $\hat{X}_c$ for CC c | Values of $\alpha_c$, c = 0, 1 . . . , K |
|---|---|---|---|
| K > M | M | $\hat{X}_c = X$ | $\alpha_c = 1/M$ for c = 0, 1, . . . M − 1; $\alpha_c = 0$ for c = M − 1, . . . , K − 1 |

TABLE 2-continued

Independent Overbooking Handling

| Number of CCs | Number of CCs scheduled with PDCCH | Per CC limit $\hat{X}_c$ for CC c | Values of $\alpha_c$, c = 0, 1 ..., K |
|---|---|---|---|
| K | | $\hat{X}_c = \dfrac{M \cdot X}{K}$ | $\alpha_c = 1/K$ for c = 0, 1, ... K – 1; |
| K | | $\hat{X}_c = \dfrac{M \cdot X \cdot BW_c}{\sum_{n=0}^{K-1} BW_n}$ | $\alpha_c = \dfrac{BW_c}{\sum_{n=0}^{K-1} BW_n}$ for c = 0, 1, ... K – 1; |
| K | | $\hat{X}_c = \dfrac{M \cdot X \cdot x_c}{\sum_{n=0}^{K-1} x_n}$ | $\alpha_c = \dfrac{x_c}{\sum_{n=0}^{K-1} x_n}$ for c = 0, 1, ... K – 1; |

As indicated above, in any of the cases where the CA limit is distributed across CCs 205, the UE 115-a and base station 105-a may optionally first reduce the number of CCs 205 that can be scheduled with PDCCH 210, then distribute CA limit among CCs. A CC 205 is not scheduled with PDCCH 210 if the corresponding $a_c$ is set to 0. In some cases, the UE 115-a and base station 105-a may keep the per CC limit the same as single carrier limit (X) for some CCs (e.g., PCell/PSCell), and distribute the remaining limit among the other CCs. A CC's 205 per-CC limit ($\hat{X}_c$) can be set equal to single carrier limit (X) if the corresponding $a_c$=1/M for this CC.

As can be seen from Tables 1 and 2, if the number of CCs (K) is four or less, the CA limit is satisfied as long as number of BD/CCE per CC does not exceed the single carrier limit (X). Further, if the number of CCs (K) is greater than four but does not exceed the UE 115-a capability (M), the number of BD/CCE per CC may not (e.g., should not) exceed the single carrier limit (X), and in such case the total number of BD/CCE of all CCs will not exceed the CA limit. However, if the number of CCs (K) is greater than the UE 115-a capability (M), then the number of CCs that can be configured with PDCCH may be reduced to the UE capability; the CA limit may be evenly distribution among all CCs $$\left(\hat{X}_c = \dfrac{M \cdot X}{K}\right),$$

the CA limit may be distributed based on a fixed proportion among CCs, such as based on BW of CCs $$\left(\hat{X}_c = \dfrac{M \cdot X \cdot BW_c}{\sum_{n=0}^{K-1} BW_n}\right),$$

or the CA limit may be distributed based on a proportional distribution of the CA limit among all CCs 205 based on a BD/CCE number configured to each CC $$\left(\hat{X}_c = \dfrac{M \cdot X \cdot x_c}{\sum_{n=0}^{K-1} x_n}\right).$$

Such techniques may be applied for CCs 205 having a same numerology or having a different numerology as will be discussed in more detail below. In some case, such techniques may be used in cross-carrier scheduling, as will also be discussed in more detail below.

In other cases, rather than distributing BDs/CCEs, overbooking handling may allow overbooking only for some CCs 205 and not allow overbooking for other CCs 205. In such examples, for CCs that are allowed to be overbooked, their PDCCH configuration is allowed to exceed the per-CC limit, and the base station 105-a and UE 115-a may perform overbooking handling to trim the PDCCH configuration so that the mapped PDCCHs for the CC do not exceed the per-CC limit and CA limit. In such examples, for CCs 205 that are not allowed to be overbooked, their PDCCH configuration is not allowed to exceed the per-CC limit. As long as CCs 205 that are allowed to be overbooked do not exceed their per-CC limit, mapping of CCs 205 that are not allowed to be overbooked will not exceed the CA limit. In some cases, one or more CCs 205, which may be a subset of the total number of CCs 205, may be indicated as allowed to be overbooked. In some cases, only a PCC and/or PSCC may be allowed to be overbooked, and remaining CCs 205 may not be overbooked. Once the control channel candidates are allocated to the CCs 205, mapping of BDs/CCEs to the control channel candidates may be performed.

Figure 3:
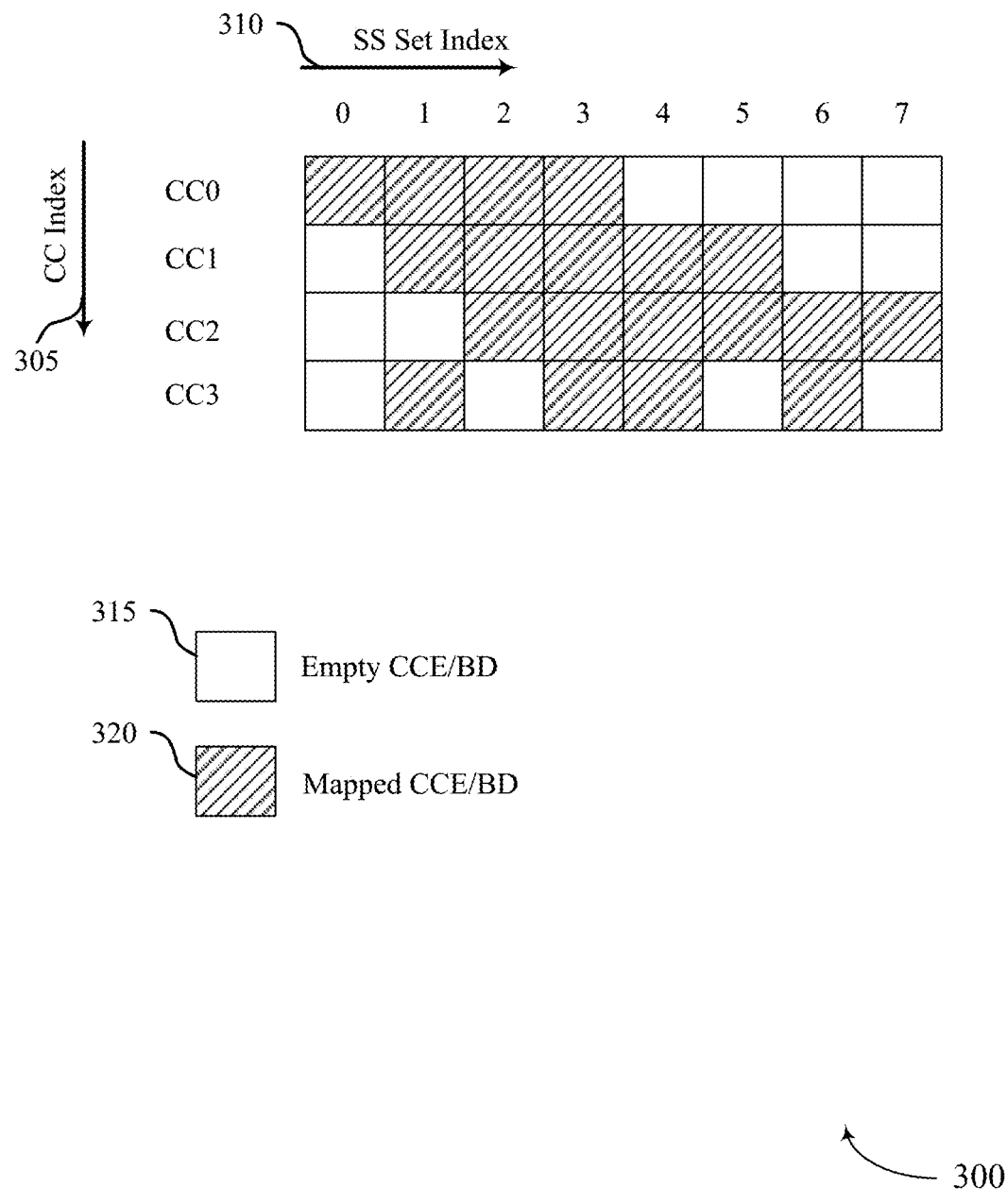
FIG. 3 illustrates an example of a BD/CCE mapping in accordance with aspects of the present disclosure.

FIG. 3 illustrates an example of a BD/CCE mapping 300 that supports search space design with overbooking in carrier aggregation in accordance with aspects of the present disclosure. In some examples, BD/CCE mapping 300 may implement aspects of wireless communications system 100. In this example, a CC index 305 may correspond to an index value for each CC, and a SS set index 310 may correspond to an index of a SS set of a number of different SS sets that may be configured.

In some cases, mapping of SS sets of each CC, from the lowest CC index to the highest CC index, may be performed. In such cases, mapping may be stopped for a CC if the per-CC limit is reached or if the CC is fully mapped. In such cases, for each CC, a number may indicate how many SS sets of the CC are mapped. In other cases, mapping of CCs associated with each SS set, from the lowest SS set index to the highest SS set index, may be performed. In such cases, the mapping may skip a CC if the per-CC limit is reached or the CC is fully mapped. In such cases, one number may indicate how many SS sets are fully mapped, and one number may indicate how many CCs are mapped for the partially mapped SS set. Such mapping based on the per-CC limits that are obtained as discussed above, provides that there is no need to check the CA limit while mapping. For self-carrier scheduling, these two options above give same mapping result. For cross-carrier scheduling, more candidates may get mapped to a larger CC index due to CCE/BD reuse. In some cases, cross-carrier scheduling may not allow CCE/BD reuse among CCs for CA overbooking.

As indicated above, in some cases, joint overbooking handling of CCs may be used. In such cases, if the number of CCs exceeds the UE capability, overbooking handling may be performed for each CC based on the single carrier limit and CA limit. Again, in such cases, there are two dimensions to sweep in mapping, namely the CC index 305 and SS set index 310. In some cases, all SS sets of each CC may be mapped from the lowest CC index to the highest CC index. In such cases, mapping may be stopped for a CC if the single carrier limit is reached or the CC is fully mapped. Further, mapping may be stopped for any CC if the CA limit is reached. For each CC, a number indicates how many search space sets of the CC are mapped.

In other cases, all CCs associated with a SS set may be mapped from the lowest SS set index to the highest SS set index. In such cases, a CC may be skipped if the single carrier limit is reached or the CC is fully mapped. Further, mapping may be stopped for any CC associated with any SS set if the CA limit is reached. One number may indicate how many SS sets are fully mapped, and one number to indicate how many CCs are mapped for the partially mapped SS set. In either of these mapping cases, the number of CCs that can be scheduled with PDCCH is unknown before mapping is finished.

Figure 4:
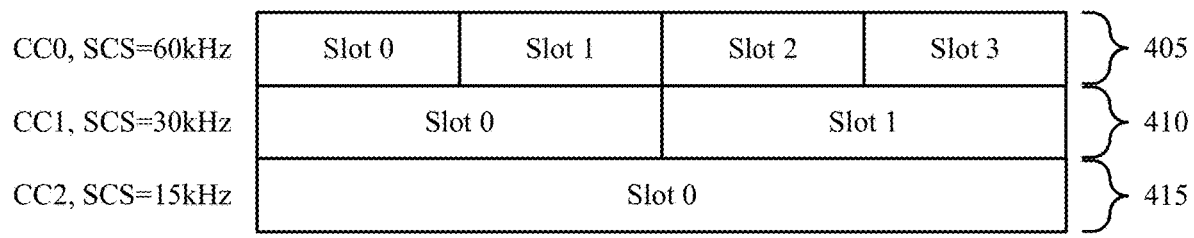
FIG. 4 illustrates an example of a mixed numerology CC configuration in accordance with aspects of the present disclosure.

FIG. 4 illustrates an example of a mixed numerology CC configuration 400 that supports search space design with overbooking in carrier aggregation in accordance with aspects of the present disclosure. In some examples, mixed numerology CC configuration 400 may implement aspects of wireless communications system 100. In this example, a first CC 405 (CC0) may have a 60 kHz SCS, a second CC 410 (CC1) may have a 30 kHz SCS, and a third CC 415 (CC2) may have a 15 kHz SCS. Such different SCSs thus provide that each CC 405-415 has a slot with a different duration, and various techniques may provide overbooking handling for such mixed numerology cases.

In some cases, a common slot may be defined and CA limits may be determined based on the common slot. In some cases, the need of a common slot may be avoided by converting the CA limit/overbooking into per CC limit/overbooking. In other cases, a reference SCS may be identified, and the corresponding reference slot may be the common slot. The CA limit in such mixed numerology cases and overbooking handling may be performed using similar techniques as discussed above with respect to FIGS. 2 and 3, as will be discussed in more detail below. Further, in some cases, cross-carrier scheduling may be implemented, in which a scheduling CC may schedule one or more other CCs that may have a different SCS.

Figure 5:
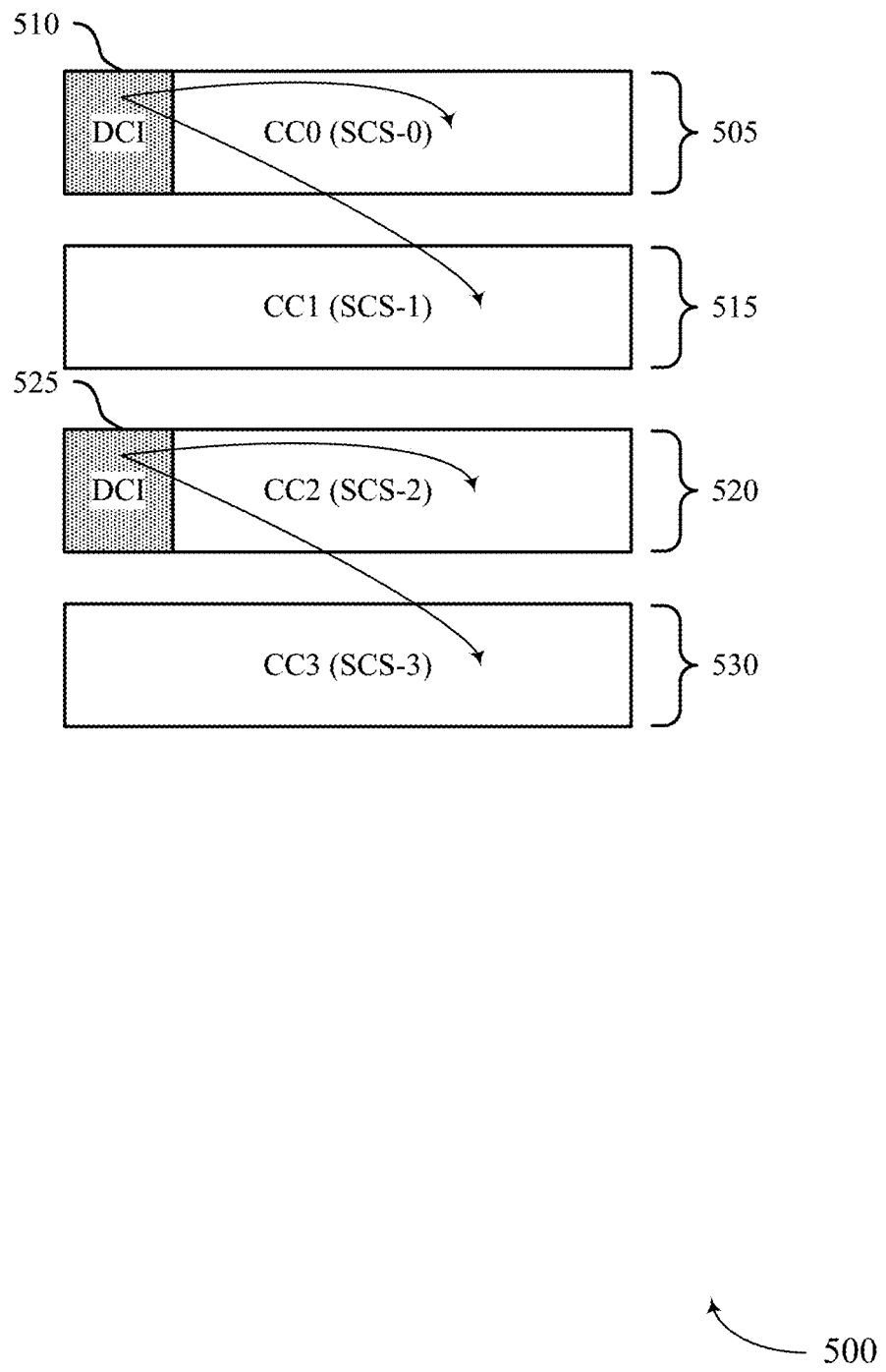
FIG. 5 illustrates an example of cross-carrier scheduling in accordance with aspects of the present disclosure.

FIG. 5 illustrates an example of cross-carrier scheduling 500 that supports search space design with overbooking in carrier aggregation in accordance with aspects of the present disclosure. In some examples, cross-carrier scheduling 500 may implement aspects of wireless communications system 100. In this example, a first CC 505 (CC0) may be a scheduling CC and scheduling DCI 510 may be used to schedule a second CC 515 (CC1). Similarly, a third CC 520 (CC2) may be a scheduling CC and scheduling DCI 525 may be used to schedule a fourth CC 530 (CC3).

In some cases, for cross-carrier scheduling, the CA limit can be defined based on the scheduling CC's SCS. In such cases, if there is one scheduling CC, the mixed numerology CA may be treated as same numerology CA with SCS equal to the scheduling CC's SCS. Such treatment is logical because PDCCH decoding occurs in the scheduling CC. In cases with two or more scheduling CCs, scheduled CCs may use the SCS of the scheduling CC. Using such techniques, overbooking handling may be performed in a similar manner as discussed above for self-carrier scheduling. In the example of FIG. 5, the first CC 505 may have a first SCS of 15 kHz, and the second CC 515 may have a second SCS of 30 kHz. Further, the third CC 520 may have a third SCS of 60 kHz, and the fourth CC 530 may have a fourth SCS of 120 kHz. In such cases, BD/CCE limits and handling of overbooking may be performed as if the first CC 505 and second CC 515 both have the first SCS of 15 kHz, and as if the third CC 520 and fourth CC 530 both have the third SCS of 60 kHz.

Using such SCS assignments, overbooking handling may be performed in a similar manner as discussed above. For example, for independent overbooking handling of CCs, again the number of CCs is K, UE capability is M, single carrier limit is $X_c$, and bandwidth is $BW_c$ for CC c. The BD/CCE number of the configured PDCCHs on CC c is $x_c$. As indicated above, for cross-carrier scheduling, the scheduled CC follows the scheduling CC for per-CC and CA limits. Tables 3 and 4 below provide a number of exemplary distribution techniques.

Again, similarly as discussed above, in any of the cases where the CA limit is distributed, the UE and base station may optionally first reduce the number of CCs that can be scheduled with PDCCH, then distribute CA limit among remaining CCs, or may keep the per-CC limit same as single carrier limit for some CCs, distribute the remaining CA limit among the other CCs.

TABLE 3

Independent Overbooking Handling

| Number of CCs | Number of CCs scheduled with PDCCH | Per CC limit for CA $\hat{X}_c$ | Note |
|---|---|---|---|
| K ≤ 4 | K | $\hat{X}_c = X_c$ | |
| 4 < K ≤ M | K | $\hat{X}_c = X_c$ | |
| K > M | M | $\hat{X}_c = X_c$ | Reduced number of CCs |
| | K | $\hat{X}_c = \dfrac{M \cdot X_c}{K}$ | Even distribution |
| | K | $\hat{X}_c = \dfrac{M \cdot X_c \cdot BW_c}{\sum_{n=0}^{K-1} BW_n}$ | BW proportional distribution |
| | K | $\hat{X}_c = \dfrac{M \cdot X_c \cdot x_c}{\sum_{n=0}^{K-1} x_n}$ | Configuration proportional distribution, distribution changes from slot to slot |

Such techniques for provide a number of options for distribute the CA limit of BD or CCE among CCs so that the total number of BD or CCE does not exceed the CA limit as long as each CC does not exceed the per-CC limit. In cases where K>M options may be generalized by the below formula where the per-CC limit for CC c can be defined by a set of non-negative numbers $a_c$, c=0, 1 . . . , K−1

$$\hat{X}_c = a_c \cdot M \cdot X.$$

In some cases, the set of non-negative numbers $a_c$, c=0, 1 . . . , K−1 satisfies the condition that $\sum_{c=0}^{K-1} a_c = 1$. Additionally, in some cases, the set of non-negative numbers $a_c$, c=0, 1 . . . , K−1 optionally satisfies the additional contention $a_c \leq 1/M$ for any c. Table 4 provides, for such cases, $\hat{X}_c$ for various values of $a_c$ in accordance with the above equation.

TABLE 4

Independent Overbooking Handling

| Number of CCs | Number of CCs scheduled with PDCCH | Per CC limit $\hat{X}_c$ for CC c | Values of $\alpha_c$, c = 0, 1 . . . , K |
|---|---|---|---|
| K > M | M | $\hat{X}_c = X_c$ | $\alpha_c = 1/M$ for c = 0, 1, . . . M − 1; $\alpha_c = 0$ for c = M − 1, . . . , K − 1 |
|  | K | $\hat{X}_c = \dfrac{M \cdot X_c}{K}$ | $\alpha_c = 1/K$ for c = 0, 1, . . . K − 1; |
|  | K | $\hat{X}_c = \dfrac{M \cdot X_c \cdot BW_c}{\sum_{n=0}^{K-1} BW_n}$ | $\alpha_c = \dfrac{BW_c}{\sum_{n=0}^{K-1} BW_n}$ for c = 0, 1, ... K − 1; |
|  | K | $\hat{X}_c = \dfrac{M \cdot X_c \cdot x_c}{\sum_{n=0}^{K-1} x_n}$ | $\alpha_c = \dfrac{x_c}{\sum_{n=0}^{K-1} x_n}$ for c = 0, 1, ... K − 1; |

As indicated by tables 3 and 4, the CA limit can be described by a number K, if number of CCs does not exceed four, or does not exceed the UE capability. Further, a summation of per-CC limits normalized by the corresponding single carrier limit satisfies $$\sum_{c=0}^{K-1} \frac{\hat{X}_c}{X_c} = K.$$

The CA limit can be described by a number M, if number of CCs exceeds the UE capability, and a summation of per CC limits normalized by the corresponding single carrier limit satisfies $$\sum_{c=0}^{K-1} \frac{\hat{X}_c}{X_c} = M.$$

As can be seen from Tables 1 and 2, if the number of CCs (K) is four or less, the CA limit is satisfied as long as number of BD/CCE per CC does not exceed the single carrier limit (X). Further, if the number of CCs (K) is greater than four but does not exceed the UE capability (M), the number of BD/CCE per CC should not exceed the single carrier limit (X), and in such case the total number of BD/CCE of all CCs will not exceed the CA limit. However, if the number of CCs (K) is greater than the UE capability (M), then the number of CCs that can be configured with PDCCH may be reduced to the UE capability; the CA limit may be evenly distribution among all CCs $$\left(\hat{X}_c = \frac{M \cdot X_c}{K}\right),$$

the CA limit may be distributed based on a fixed proportion among CCs, such as based on BW of CCs $$\left\{\hat{X}_c = \frac{M \cdot X_c \cdot BW_c}{\sum_{n=0}^{K-1} BW_n}\right\},$$

or the CA limit may be distributed based on a proportional distribution of the CA limit among all CCs based on a BD/CCE number configured to each CC $$\left\{\hat{X}_c = \frac{M \cdot X_c \cdot x_c}{\sum_{n=0}^{K-1} x_n}\right\}.$$

Thus, overbooking handling of CA can be performed by single carrier overbooking handling of each CC in the same way as the same numerology CA discussed above.

Figure 6:
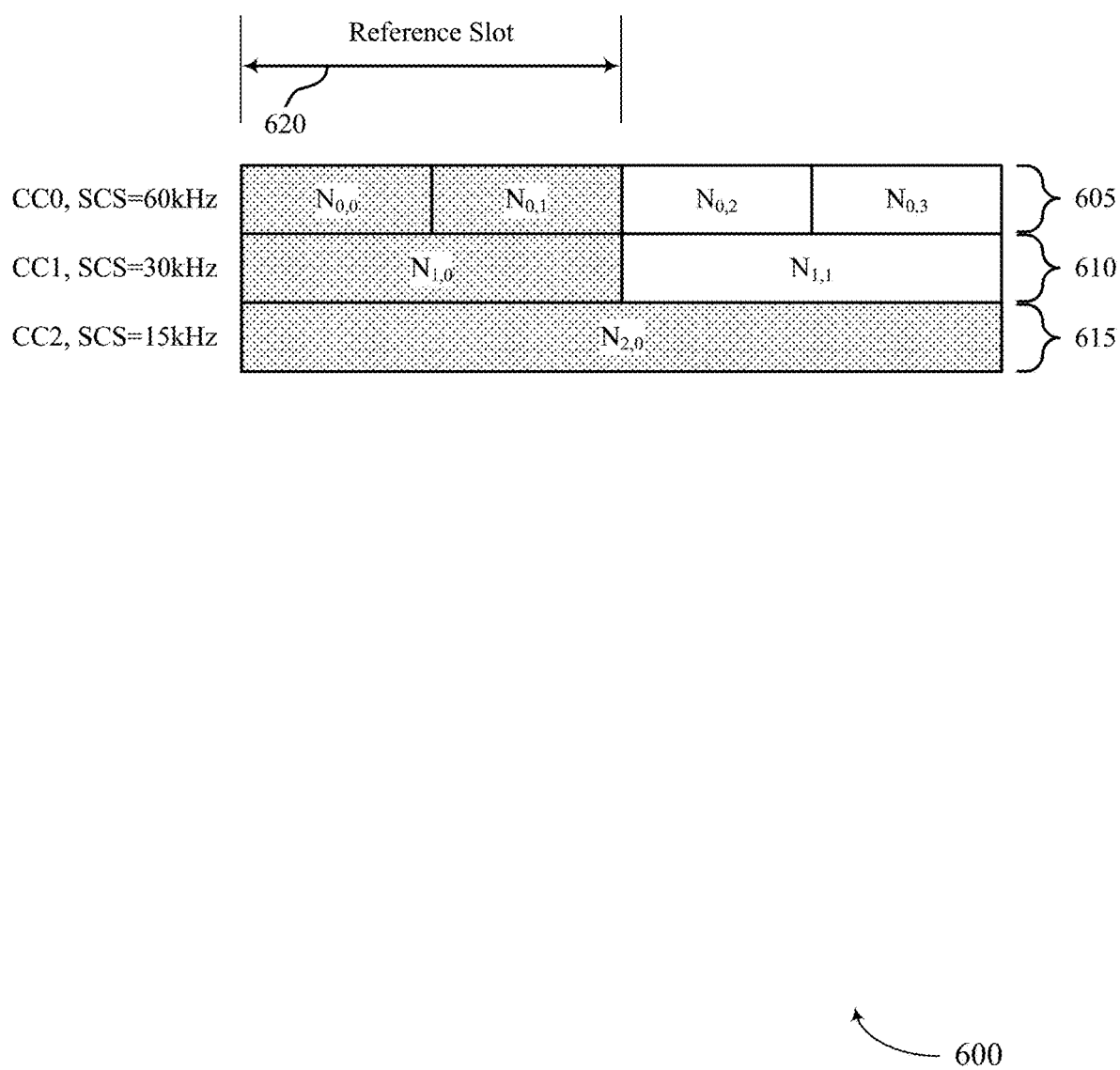
FIG. 6 illustrates an example of a mixed numerology reference slot in accordance with aspects of the present disclosure.

FIG. 6 illustrates an example of a mixed numerology reference slot 600 that supports search space design with joint overbooking in carrier aggregation in accordance with aspects of the present disclosure. In some examples, mixed numerology reference slot 600 may implement aspects of wireless communications system 100. In this example, a first CC 605 (CC0) may have a 60 kHz SCS, a second CC 610 (CC1) may have a 30 kHz SCS, and a third CC 615 (CC2) may have a 15 kHz SCS. Such different SCSs thus provide that each CC 605-615 has a slot with a different duration, and various techniques may provide overbooking handling for such mixed numerology cases.

In cases where joint overbooking is used for mixed numerology CCs, a reference SCS may be selected, and a per slot limit may be defined based on a reference slot 620 of the reference SCS. In the example, of FIG. 6, the SCS of the second CC 610 may be selected as the reference SCS. In such cases, the per-CC limit may be the same as single carrier limit, and overbooking handling determines how many CCs can be mapped with PDCCH candidates. Limits may be determined, for example, by counting the number of BD/CCE within the reference slot 620 for each CC 605-615.

In such cases, if the SCS of a CC is greater than or equal to the reference SCS, the BD/CCE numbers of all slots of this CC that entirely overlap with the reference slot may be summed. In the example, of FIG. 6, such a sum would be $N_{0,0}+N_{0,1}$ for the first CC 605, and $N_{1,0}$ for the second CC 610. If the SCS of a CC is less than the reference SCS, the BD/CCE number of the slot of this CC that partially overlaps with the reference slot is scaled by the ratio of the corresponding CC SCS to the reference SCS. In the example of FIG. 6, this would be $N_{2,0}/2$ for the third CC 615.

A total BD/CCE consumption of all CCs within the reference slot may then be calculated. For each CC, the BD/CCE number within reference slot may be normalized by the corresponding single carrier limit and the number of slots of this CC overlapping with the reference slot. If part of a slot of this CC overlaps with the reference slot, the number of slots of this CC overlapping with the reference slot is the percentage of the overlapping part of the slot. For example, for the CC with SCS=15 kHz in FIG. 6, the number of slots that overlap with the reference slot is ½ or 50%. Then, the total number may be calculated by summing up the normalized number of all CCs. In the example, if FIG. 6, such a sum would be $$\frac{N_{0,0}+N_{0,1}}{2*48}+\frac{N_{1,0}}{56}+\frac{N_{2,0}}{56}.$$

Mapping may then be performed based on the BD/CCD number. Again, two dimensions may be swept, corresponding to a CC index and a SS set index. In some cases, all SS sets of each CC from the lowest CC index to the highest CC index, in a reference slot, may be mapped. Mapping may be stopped for a CC in a slot of the CC if the single carrier limit is reached or the CC is fully mapped in the slot(s) of the CC that partially or fully overlap with the reference slot. Further, mapping CCs may be stopped if the CA limit is reached. For each CC in such cases, a number indicates how many search space sets of the CC are mapped in a slot of the CC. In other cases, all CCs associated with a SS set may be mapped from the lowest SS set index to the highest SS set index, in a reference slot. In such cases, a CC may be skipped in a slot of the CC if single carrier limit is reached or the CC is fully mapped in slot(s) of each CC that overlaps partially or fully with the reference slot. Mapping may be stopped for any CC associated with any SS set if the CA limit is reached. One number in such cases may indicate how many SS sets are fully mapped, and one number may indicate how many CCs are mapped for the partially mapped SS set. The number of CCs that can be scheduled with PDCCH is unknown before mapping is finished.

Figure 7:
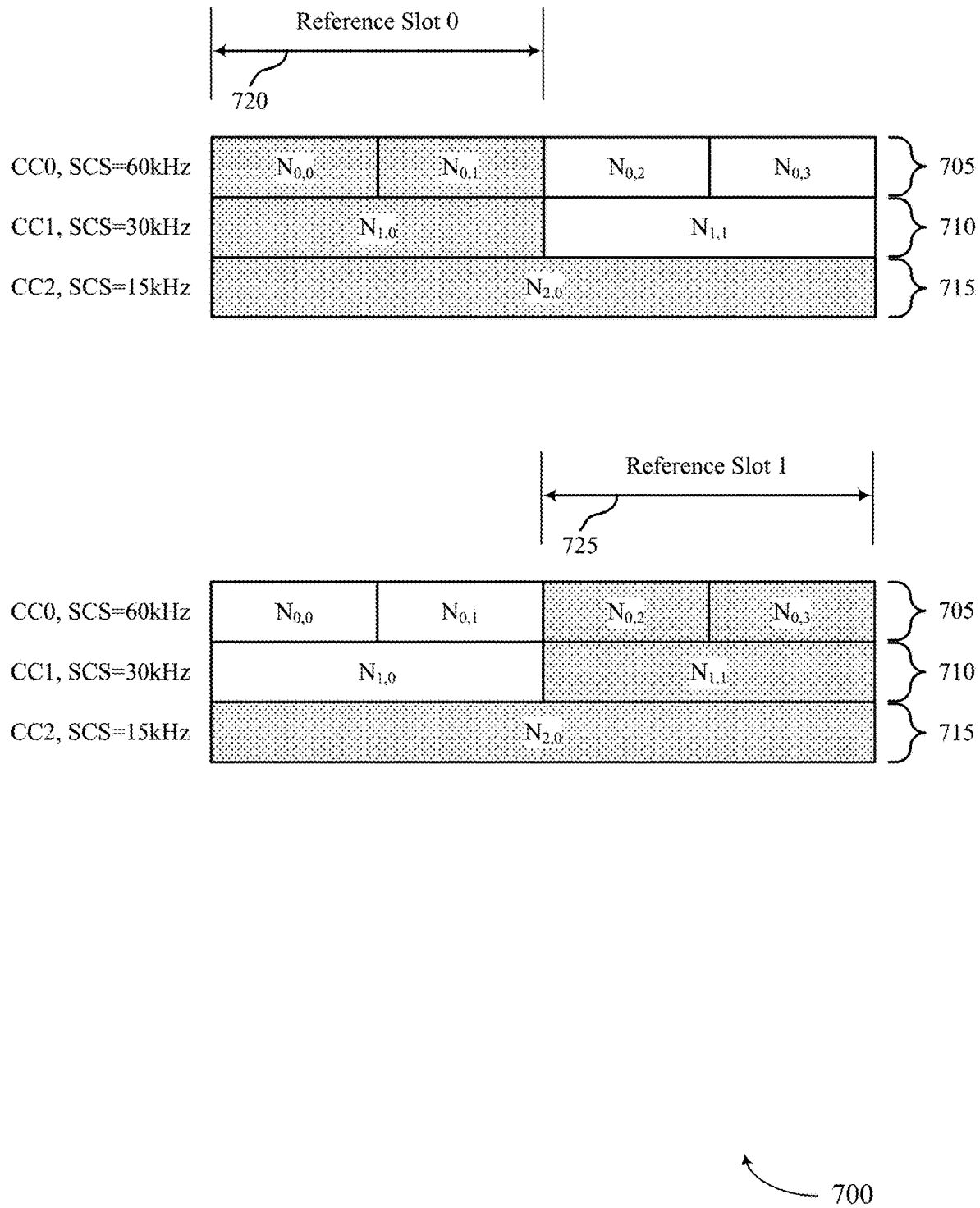
FIG. 7 illustrates another example of a mixed numerology reference slot in accordance with aspects of the present disclosure.

FIG. 7 illustrates an example of a mixed numerology reference slot 700 that supports search space design with overbooking in carrier aggregation in accordance with aspects of the present disclosure. In some examples, mixed numerology reference slot 700 may implement aspects of wireless communications system 100. In this example, a first CC 705 (CC0) may have a 60 kHz SCS, a second CC 710 (CC1) may have a 30 kHz SCS, and a third CC 715 (CC2) may have a 15 kHz SCS. Such different SCSs thus provide that each CC 705-715 has a slot with a different duration, and various techniques may provide overbooking handling for such mixed numerology cases.

In cases where joint overbooking is used for mixed numerology CCs, again, a reference SCS may be selected, and a per slot limit may defined based on the reference SCS, which may provide a first reference slot 720 and a second reference slot 725. In the example, of FIG. 7, the SCS of the second CC 710 may be selected as the reference SCS. In cases where SCS of a CC is less than the reference SCS, a slot of this CC partially overlaps with multiple reference slots of the reference SCS, as in the example of the slot of the third CC 715 partially overlapping the first reference slot 720. Mapping of the third CC 715 is performed in the first reference slot 720, namely $N_{2,0}$ for the third CC 715 in the first reference slot 720. In other reference slots that overlap with the slot of the third CC 715, which is second reference slot 725 in the example of FIG. 7, the BD/CCE consumption of the third CC 715 is deducted from the CA limit before the other CCs are mapped, and thus the contribution of $N_{2,0}$ in the second reference slot 725 is deducted. In some cases, the smallest SCS of configured CCs may be selected as the reference SCS, in order to avoid such partially overlapping slots.

Figure 8:
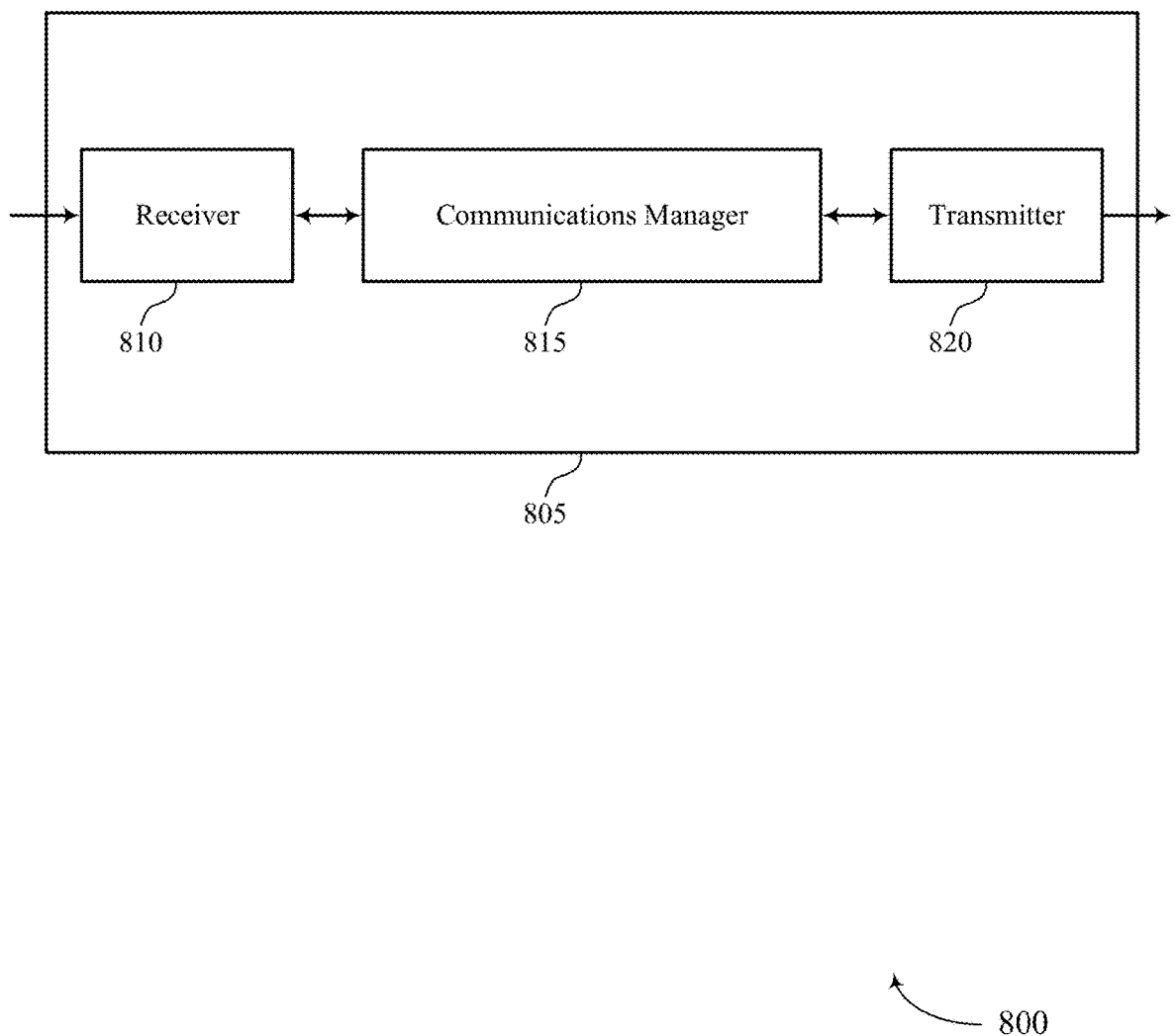
FIGS. 8 and 9 show block diagrams of devices in accordance with aspects of the present disclosure.

FIG. 8 shows a block diagram 800 of a device 805 that supports search space design with overbooking in carrier aggregation in accordance with aspects of the present disclosure. The device 805 may be an example of aspects of a UE 115 or base station 105 as described herein. The device 805 may include a receiver 810, a communications manager 815, and a transmitter 820. The device 805 may also include a processor. Each of these components may be in communication with one another (e.g., via one or more buses).

Receiver 810 may receive information such as packets, user data, or control information associated with various information channels (e.g., control channels, data channels, and information related to search space design with overbooking in carrier aggregation, etc.). Information may be passed on to other components of the device 805. The receiver 810 may be an example of aspects of the transceiver 1120 or 1220 as described with reference to FIGS. 11 and 12. The receiver 810 may utilize a single antenna or a set of antennas.

The communications manager 815 may establish a wireless connection via a set of CCs using CA, communicate based on the applied set of control channel candidates, determine a CA limit corresponding to a total number of configurable control channel candidates across the set of CCs, the control channel candidates including BD candidates or CCE candidates for channel estimation, determine a per-CC limit corresponding to a per-CC number of control channel candidates that are configurable for each CC of the set of CCs, and determine an applied set of control channel candidates by allocating control channel candidates across a number of configured control channel candidates of the set of CCs based on the CA limit and the per-CC limit, where the number of configured control channel candidates for at least one of the CCs may exceed the per-CC limit.

The communications manager 815 may also establish a wireless connection via two or more CCs using CA, communicate based on the applied set of control channel candidates, identify a first subset of the two or more CCs in which configured control channel candidates may exceed a per-CC limit of control channel candidates for each CC, the control channel candidates corresponding to locations for control channel processing objects for blind decoding (BD) or control channel elements (CCEs) for channel estimation, identify a second subset of the two or more CCs in which the number of configured control channel candidates comply with the per-CC limit of control channel candidates for each CC, and determine an applied set of control channel candidates for the first subset of CCs by mapping control channel candidates across the first subset of CCs such that mapped control channel candidates comply with the per-CC limit.

The communications manager 815 may be an example of aspects of the communications manager 1110 or 1210 as described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 820 may transmit signals generated by other components of the device 805. In some examples, the transmitter 820 may be collocated with a receiver 810 in a transceiver module. For example, the transmitter 820 may be an example of aspects of the transceiver 1120 or 1220 as described with reference to FIGS. 11 and 12. The transmitter 820 may utilize a single antenna or a set of antennas.

Figure 9:
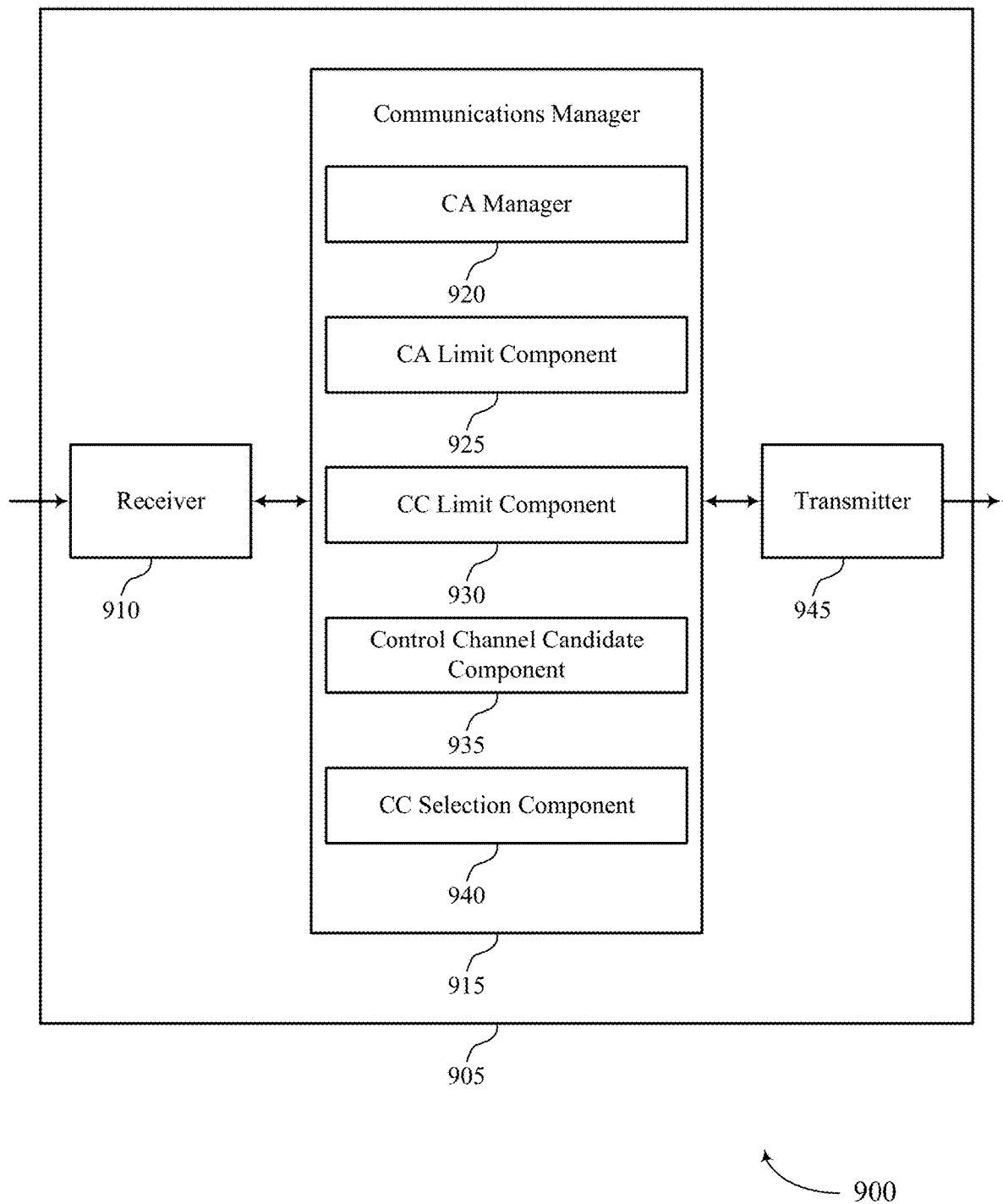

FIG. 9 shows a block diagram 900 of a device 905 that supports search space design with overbooking in carrier aggregation in accordance with aspects of the present disclosure. The device 905 may be an example of aspects of a device 805, a UE 115, or a base station 105 as described herein. The device 905 may include a receiver 910, a communications manager 915, and a transmitter 945. The device 905 may also include a processor. Each of these components may be in communication with one another (e.g., via one or more buses).

Receiver 910 may receive information such as packets, user data, or control information associated with various information channels (e.g., control channels, data channels, and information related to search space design with overbooking in carrier aggregation, etc.). Information may be passed on to other components of the device 905. The receiver 910 may be an example of aspects of the transceiver 1120 or 1220 as described with reference to FIGS. 11 and 12. The receiver 910 may utilize a single antenna or a set of antennas.

The communications manager 915 may be an example of aspects of the communications manager 815 as described herein. The communications manager 915 may include a CA manager 920, a CA limit component 925, a CC limit component 930, a control channel candidate component 935, and a CC selection component 940. The communications manager 915 may be an example of aspects of the communications manager 1110 or 1210 as described herein.

The CA manager 920 may establish a wireless connection via a set of CCs using CA and communicate based on the applied set of control channel candidates.

The CA limit component 925 may determine a CA limit corresponding to a total number of configurable control channel candidates across the set of CCs, the control channel candidates including BD candidates or CCE candidates for channel estimation.

The CC limit component 930 may determine a per-CC limit corresponding to a per-CC number of control channel candidates that are configurable for each CC of the set of CCs.

The control channel candidate component 935 may determine an applied set of control channel candidates by allocating control channel candidates across a number of configured control channel candidates of the set of CCs based on the CA limit and the per-CC limit, where the number of configured control channel candidates for at least one of the CCs may exceed the per-CC limit. In some cases, the control channel candidate component 935 may determine an applied set of control channel candidates for the first subset of CCs by mapping control channel candidates across the first subset of CCs such that mapped control channel candidates comply with the per-CC limit.

The CC selection component 940 may identify a first subset of the two or more CCs in which configured control channel candidates may exceed a per-CC limit of control channel candidates for each CC, the control channel candidates corresponding to locations for control channel processing objects for BD or CCEs for channel estimation and identify a second subset of the two or more CCs in which the number of configured control channel candidates comply with the per-CC limit of control channel candidates for each CC.

Transmitter 945 may transmit signals generated by other components of the device 905. In some examples, the transmitter 945 may be collocated with a receiver 910 in a transceiver module. For example, the transmitter 945 may be an example of aspects of the transceiver 1120 or 1220 as described with reference to FIGS. 11 and 12. The transmitter 945 may utilize a single antenna or a set of antennas.

Figure 10:
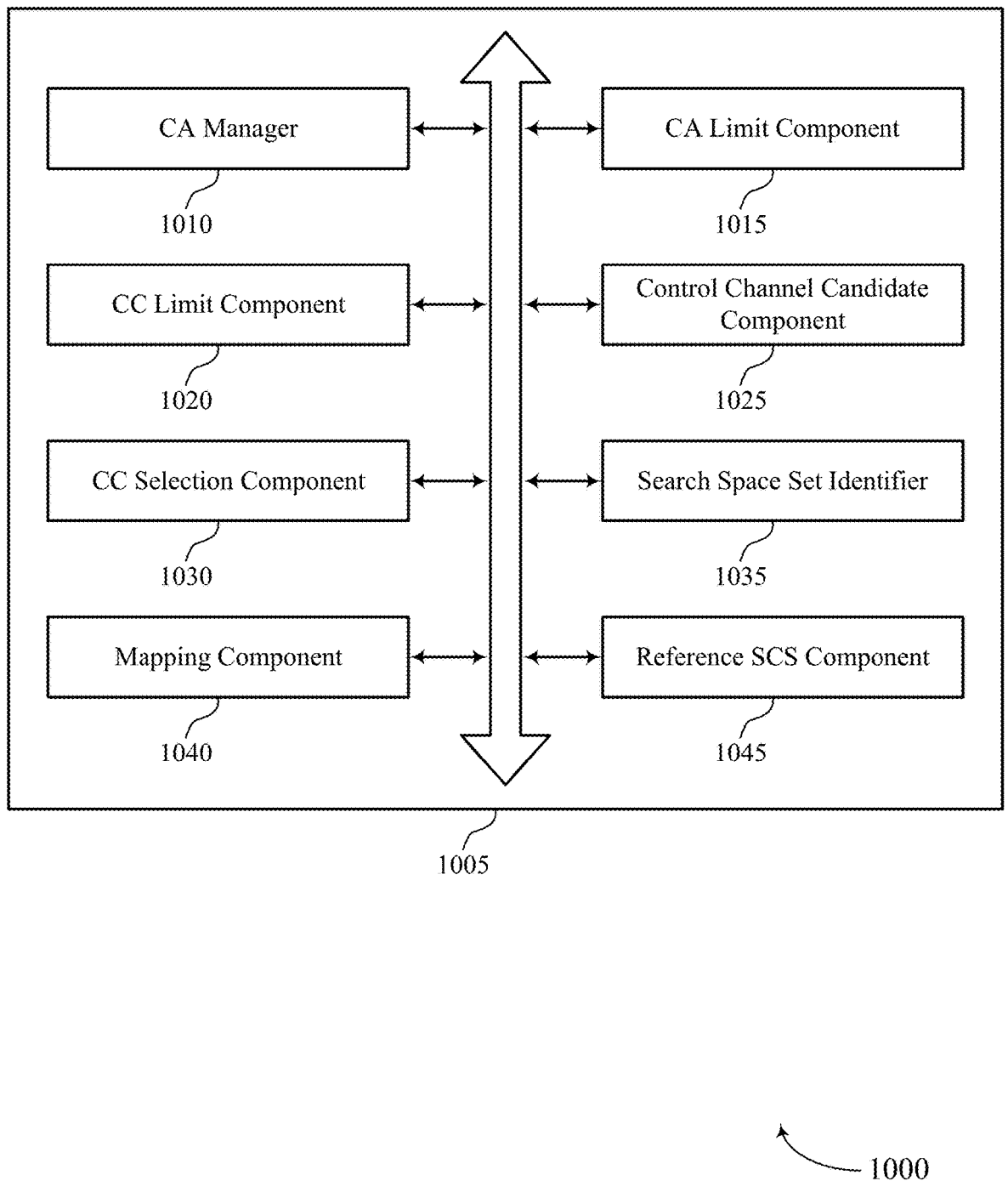
FIG. 10 shows a block diagram of a communications manager in accordance with aspects of the present disclosure.

FIG. 10 shows a block diagram 1000 of a communications manager 1005 that supports search space design with overbooking in carrier aggregation in accordance with aspects of the present disclosure. The communications manager 1005 may be an example of aspects of a communications manager 815, a communications manager 915, or a communications manager 1110 described herein. The communications manager 1005 may include a CA manager 1010, a CA limit component 1015, a CC limit component 1020, a control channel candidate component 1025, a CC selection component 1030, a search space set identifier 1035, a mapping component 1040, and a reference SCS component 1045. Each of these modules may communicate, directly or indirectly, with one another (e.g., via one or more buses).

The CA manager 1010 may establish a wireless connection via a set of CCs using CA. In some examples, the CA manager 1010 may communicate based on an applied set of control channel candidates.

The CA limit component 1015 may determine a CA limit corresponding to a total number of configurable control channel candidates across the set of CCs, the control channel candidates including BD candidates or CCE candidates for channel estimation. In some cases, the CA limit component 1015 may control the number of configured control channel candidates based at least in part on a per-CA limit. As one example, the CA limit component 1015 may control the number of configured control channel candidates to comply with the per-CA limit of control channel candidates for two or more CCs from the set of CCs.

The CC limit component 1020 may determine a per-CC limit corresponding to a per-CC number of control channel candidates that are configurable for each CC of the set of CCs. In some cases, the per-CC limit for each CC of the set of CCs is defined by a set of non-negative numbers such that the per-CC limit is a product of a selected non-negative number, the first number of CCs, and a single carrier limit of control channel candidates that are configurable for a single non-CA carrier, and where the selected non-negative number is based on whether a BD limit budget or a CCE limit budget is distributed evenly, proportional to a bandwidth, or proportional to configured control channel candidates, for each CC. In some cases, a sum of the set of non-negative numbers selected for each CC of the set of CCs equals one. In some cases, each non-negative number is less than or equal to one divided by the first number of CCs.

The control channel candidate component 1025 may determine an applied set of control channel candidates by allocating control channel candidates across a number of configured control channel candidates of the set of CCs based on the CA limit and the per-CC limit, where the number of configured control channel candidates for at least one of the CCs may exceed the per-CC limit. In some examples, the control channel candidate component 1025 may determine an applied set of control channel candidates for the first subset of CCs by mapping control channel candidates across the first subset of CCs such that mapped control channel candidates comply with the per-CC limit. In some examples, the control channel candidate component 1025 may allocate control channel candidates separately for each CC of the set of CCs, the control channel candidates for each CC allocated to comply with the per-CC limit.

In some examples, the control channel candidate component 1025 may distribute a BD limit budget or a CCE limit budget evenly across the second number of CCs, where a portion of the BD limit budget or the CCE limit budget for each CC corresponds to a product of the first number of CCs and the per-CC limit divided by the second number of CCs. In some examples, the control channel candidate component 1025 may distribute a BD limit budget or a CCE limit budget across the second number of CCs according to a bandwidth-proportional distribution, where a portion of the BD limit budget or the CCE limit budget for each CC corresponds to a product of the first number of CCs, the per-CC limit, and a bandwidth of the associated CC, divided by a total cumulative bandwidth of the second number of CCs. In some examples, the control channel candidate component 1025 may bandwidth of the associated CC corresponds to a bandwidth of a number of control resource sets (CORESETs), an active bandwidth part (BWP), or a cell bandwidth of the associated CC. In some examples, the control channel candidate component 1025 may distribute a BD limit budget or a CCE limit budget across the second number of CCs according to a slot-based proportional distribution, where a portion of the BD limit budget or the CCE limit budget for each CC corresponds to a product of the first number of CCs, the per-CC limit, and a number of BDs or CCEs associated with the configured control channel candidates of the associated CC for an associated slot, divided by a total cumulative number of configured control channel candidates of the second number of CCs.

In some examples, the control channel candidate component 1025 may allocate control channel candidates jointly for the set of CCs, the control channel candidates for each CC allocated to comply with the per-CC limit and the CA limit. In some examples, the control channel candidate component 1025 may allocate a BD limit budget or a CCE limit budget separately for each CC of the set of CCs based on control channel candidates for each CC that are allocated to comply with the per-CC limit. In some cases, a UE is capable of supporting a first number of CCs, and where a second number of CCs in the set of CCs is less than or equal to the first number of CCs, and where the control channel candidates for each CC are separately allocated to each comply with the per-CC limit. In some cases, a UE is capable of supporting a first number of CCs, and where a second number of CCs in the set of CCs is greater than the first number of CCs.

The CC selection component 1030 may identify a first subset of the two or more CCs in which configured control channel candidates may exceed a per-CC limit of control channel candidates for each CC, the control channel candidates corresponding to locations for control channel processing objects for blind decoding (BD) or control channel elements (CCEs) for channel estimation. In some examples, the CC selection component 1030 may allocate control channel candidates across the subset of CCs, where the control channel candidates for each CC of the subset of CCs are separately allocated to each comply with the per-CC limit.

In some examples, the CC selection component 1030 may identify a second subset of the two or more CCs in which the number of configured control channel candidates comply with the per-CC limit of control channel candidates for each CC. In some examples, the CC selection component 1030 may select a subset of CCs from the set of CCs, the subset of CCs having a third number of CCs corresponding to the first number of CCs. In some examples, the CC selection component 1030 may reduce a number of CCs of the set of CCs that can be scheduled with control channel transmissions to correspond to the second number of CCs, and distributing a BD limit budget or a CCE limit budget across configured control channel candidates of the reduced number of CCs. In some examples, the CC selection component 1030 may maintain the per-CC limit for a first subset of CCs and distributing remaining of the CA limit control channel candidates among remaining CCs of the set of CCs.

In some cases, the set of CCs includes at least a first CC having a first sub-carrier spacing (SCS) and a second CC having a second SCS that is different than the first SCS. In some cases, the first CC is a scheduling CC that provides scheduling information for each of the CCs of the set of CCs, and where the first SCS is used in determining the CA limit for the scheduling CC and each of the CCs of the set of CCs that is provided scheduling information. In some cases, the first SCS is used for the second CC for determining the applied set of control channel candidates.

In some cases, the first subset of the two or more CCs includes a primary component carrier (PCC), a primary secondary component carrier (PSCC) and the second subset of the two or more CCs includes one or more secondary component carriers (SCCs). In some cases, the two or more CCs includes at least a first CC having a first sub-carrier spacing (SCS), and a primary secondary component carrier (PSCC) and a second CC having a second SCS that is different than the first SCS. In some cases, a PCC may be also called "a primary cell" or "PCell." In some cases, a network may configure a cell as a PCell when dual connectivity (DC) is configured or when DC is not configured. When DC is configured, the PCell may be configured in a master cell group (MCG). In some cases, the PSCC may be known as "a primary secondary cell" or "PSCell." In some cases, a PSCell may be configured to be "on" when a network configures dual connectivity. In some cases, a PSCell may be configured in a secondary cell group (SCG).

The search space set identifier 1035 may identify a set of search space (SS) sets that indicate, for each CC of the set of CCs, associated resources for available control channel candidates. In some examples, the search space set identifier 1035 may identify set of search space (SS) sets that each indicate associated resources for available control channel candidates for two or more CCs, where each CC set has a SS set index. In some examples, the search space set identifier 1035 may identify a set of search space (SS) sets that indicate, for each CC of the set of CCs, associated resources for available control channel candidates.

The mapping component 1040 may map the set of SS sets of each CC of the set of CCs up to the per-CC limit to determine the applied set of control channel candidates for the corresponding CC, where each CC of the set of CCs has an ordered CC index, and where the mapping is from a lowest CC index to a highest CC index. In some examples, the mapping component 1040 may map the each CC associated with each SS set to determine the applied set of control channel candidates for the corresponding SS set, where a control channel candidate for a CC is skipped if the per-CC limit for the corresponding CC is reached or the CC is fully mapped, and where the mapping is from a lowest SS index to a highest SS index.

In some examples, the mapping component 1040 may maintain a cumulative count of mapped control channel candidates across the set of CCs. In some examples, the mapping component 1040 may stop the mapping if the cumulative count reaches the CA limit.

In some examples, the mapping component 1040 may map the each CC associated with each SS set to determine the applied set of control channel candidates for the corresponding SS set, where a control channel candidate for a CC is skipped if the per-CC limit for the corresponding CC is reached or the CC is fully mapped, and where the mapping is from a lowest SS index to a highest SS index. In some examples, the mapping component 1040 may maintain a cumulative count of mapped control channel candidates across the set of SS sets. In some cases, a number of CCs of the set of CCs that can be scheduled with control channel candidates is unknown until the allocating is finished.

The reference SCS component 1045 may identify the first SCS as a reference SCS and identify a reference slot duration based on the reference SCS. In some examples, the reference SCS component 1045 may determine a second slot duration of the second CC based on the second SCS. In some examples, the reference SCS component 1045 may determine the per-CC limit of the second CC based on the second slot duration relative to the reference slot duration. In some examples, the reference SCS component 1045 may allocate control channel candidates jointly for the set of CCs, the control channel candidates for each CC allocated to comply with the per-CC limit and the CA limit. In some examples, the reference SCS component 1045 may count a number of control channel candidates for each reference slot duration for each CC. In some examples, the reference SCS component 1045 may calculate a total number of control channel candidates for each CC in the reference slot duration. In some examples, the reference SCS component 1045 may allocate a set of BDs or CCEs to the total number control channel candidates for each CC to comply with the per-CC limit and the CA limit. In some cases, a smallest SCS of the first SCS and the second SCS is selected as the reference SCS.

In some cases, the first SCS is smaller than the second SCS, the second SCS is the reference SCS, and first slot duration of the first CC is longer than the reference slot duration, and where the total number of control channel candidates for each CC in the reference slot duration is adjusted based a portion of the first slot duration that overlaps with the subsequent reference slot duration.

Figure 11:
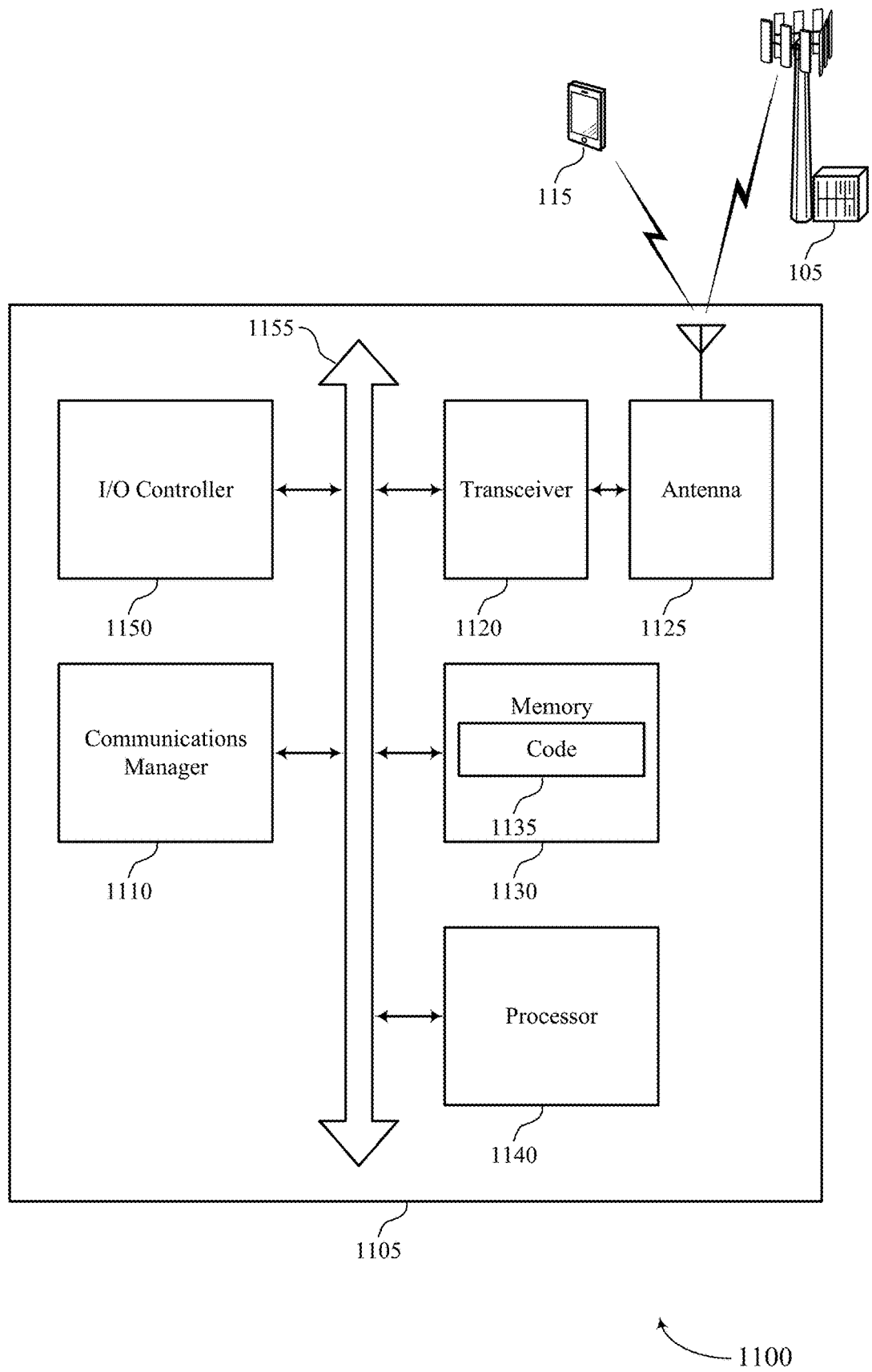
FIG. 11 shows a diagram of a system including a user equipment (UE) in accordance with aspects of the present disclosure.

FIG. 11 shows a diagram of a system 1100 including a device 1105 that supports search space design with overbooking in carrier aggregation in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, a transceiver 1120, an antenna 1125, memory 1130, a processor 1140, and an I/O controller 1150. These components may be in electronic communication via one or more buses (e.g., bus 1155).

The communications manager 1110 may establish a wireless connection via a set of component carriers (CCs) using carrier aggregation (CA), communicate based on the applied set of control channel candidates, determine a CA limit corresponding to a total number of configurable control channel candidates across the set of CCs, the control channel candidates including blind decoding (BD) candidates or control channel element (CCE) candidates for channel estimation, determine a per-CC limit corresponding to a per-CC number of control channel candidates that are configurable for each CC of the set of CCs, and determine an applied set of control channel candidates by allocating control channel candidates across a number of configured control channel candidates of the set of CCs based on the CA limit and the per-CC limit, where the number of configured control channel candidates for at least one of the CCs may exceed the per-CC limit. The communications manager 1110 may also establish a wireless connection via two or more component carriers (CCs) using carrier aggregation (CA), communicate based on the applied set of control channel candidates, identify a first subset of the two or more CCs in which configured control channel candidates may exceed a per-CC limit of control channel candidates for each CC, the control channel candidates corresponding to locations for control channel processing objects for blind decoding (BD) or control channel elements (CCEs) for channel estimation, identify a second subset of the two or more CCs in which the number of configured control channel candidates comply with the per-CC limit of control channel candidates for each CC, and determine an applied set of control channel candidates for the first subset of CCs by mapping control channel candidates across the first subset of CCs such that mapped control channel candidates comply with the per-CC limit.

Transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting search space design with overbooking in carrier aggregation).

The I/O controller 1150 may manage input and output signals for the device 1105. The I/O controller 1150 may also manage peripherals not integrated into the device 1105. In some cases, the I/O controller 1150 may represent a physical connection or port to an external peripheral. In some cases, the I/O controller 1150 may utilize an operating system such as iOS®, ANDROID®, MS-DOS®, MS-WINDOWS®, OS/2®, UNIX®, LINUX®, or another known operating system. In other cases, the I/O controller 1150 may represent or interact with a modem, a keyboard, a mouse, a touchscreen, or a similar device. In some cases, the I/O controller 1150 may be implemented as part of a processor. In some cases, a user may interact with the device 1105 via the I/O controller 1150 or via hardware components controlled by the I/O controller 1150.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
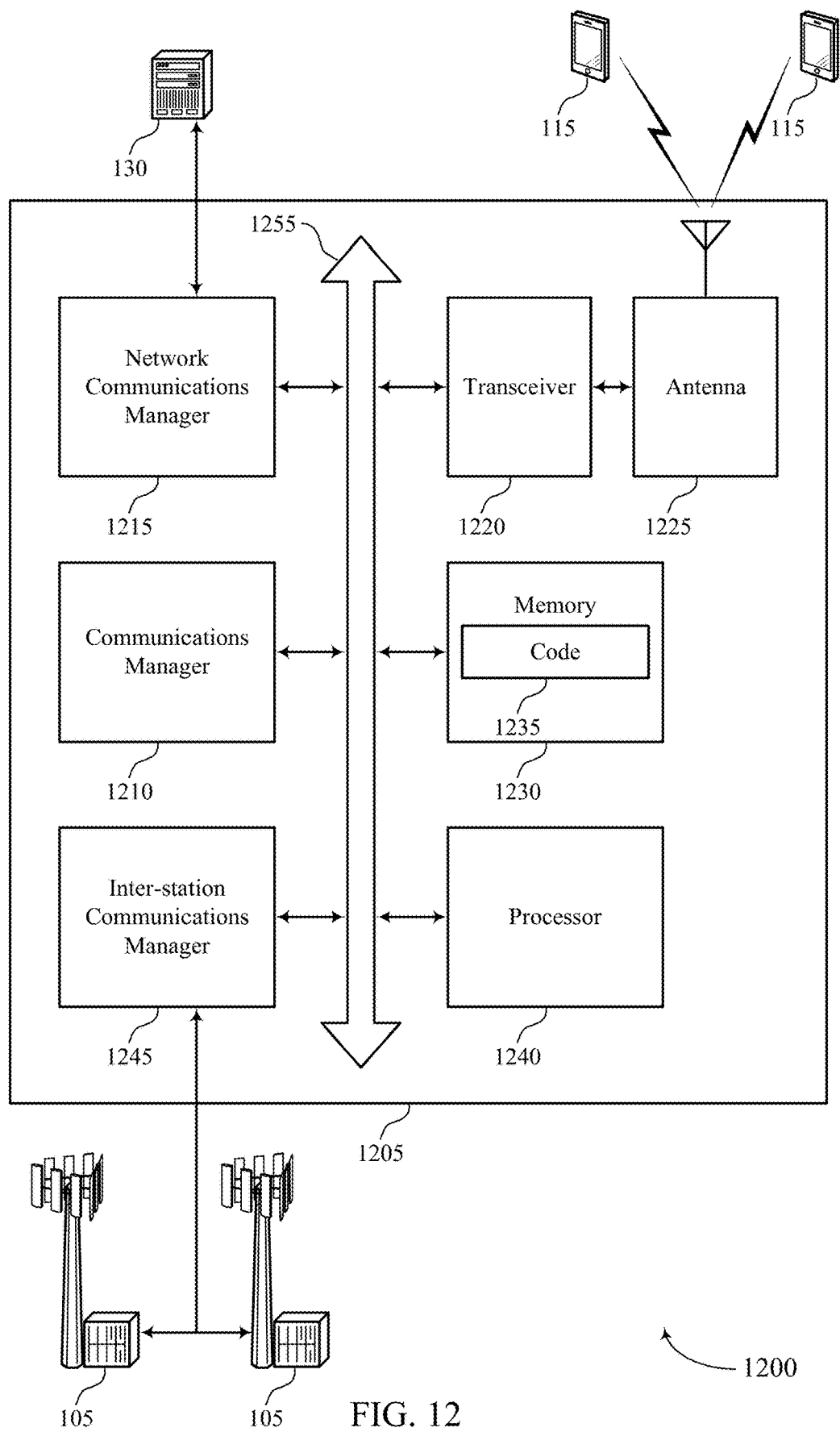
FIG. 12 shows a diagram of a system including a base station in accordance with aspects of the present disclosure.

FIG. 12 shows a diagram of a system 1200 including a device 1205 that supports search space design with overbooking in carrier aggregation in accordance with aspects of the present disclosure. The device 1205 may be an example of or include the components of device 805, device 905, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1255).

The communications manager 1210 may establish a wireless connection via a set of component carriers (CCs) using carrier aggregation (CA), communicate based on the applied set of control channel candidates, determine a CA limit corresponding to a total number of configurable control channel candidates across the set of CCs, the control channel candidates including blind decoding (BD) candidates or control channel element (CCE) candidates for channel estimation, determine a per-CC limit corresponding to a per-CC number of control channel candidates that are configurable for each CC of the set of CCs, and determine an applied set of control channel candidates by allocating control channel candidates across a number of configured control channel candidates of the set of CCs based on the CA limit and the per-CC limit, where the number of configured control channel candidates for at least one of the CCs may exceed the per-CC limit. The communications manager 1210 may also establish a wireless connection via two or more component carriers (CCs) using carrier aggregation (CA), communicate based on the applied set of control channel candidates, identify a first subset of the two or more CCs in which configured control channel candidates may exceed a per-CC limit of control channel candidates for each CC, the control channel candidates corresponding to locations for control channel processing objects for blind decoding (BD) or control channel elements (CCEs) for channel estimation, identify a second subset of the two or more CCs in which the number of configured control channel candidates comply with the per-CC limit of control channel candidates for each CC, and determine an applied set of control channel candidates for the first subset of CCs by mapping control channel candidates across the first subset of CCs such that mapped control channel candidates comply with the per-CC limit.

Network communications manager 1215 may manage communications with the core network (e.g., via one or more wired backhaul links). For example, the network communications manager 1215 may manage the transfer of data communications for client devices, such as one or more UEs 115.

Transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting search space design with overbooking in carrier aggregation).

Inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
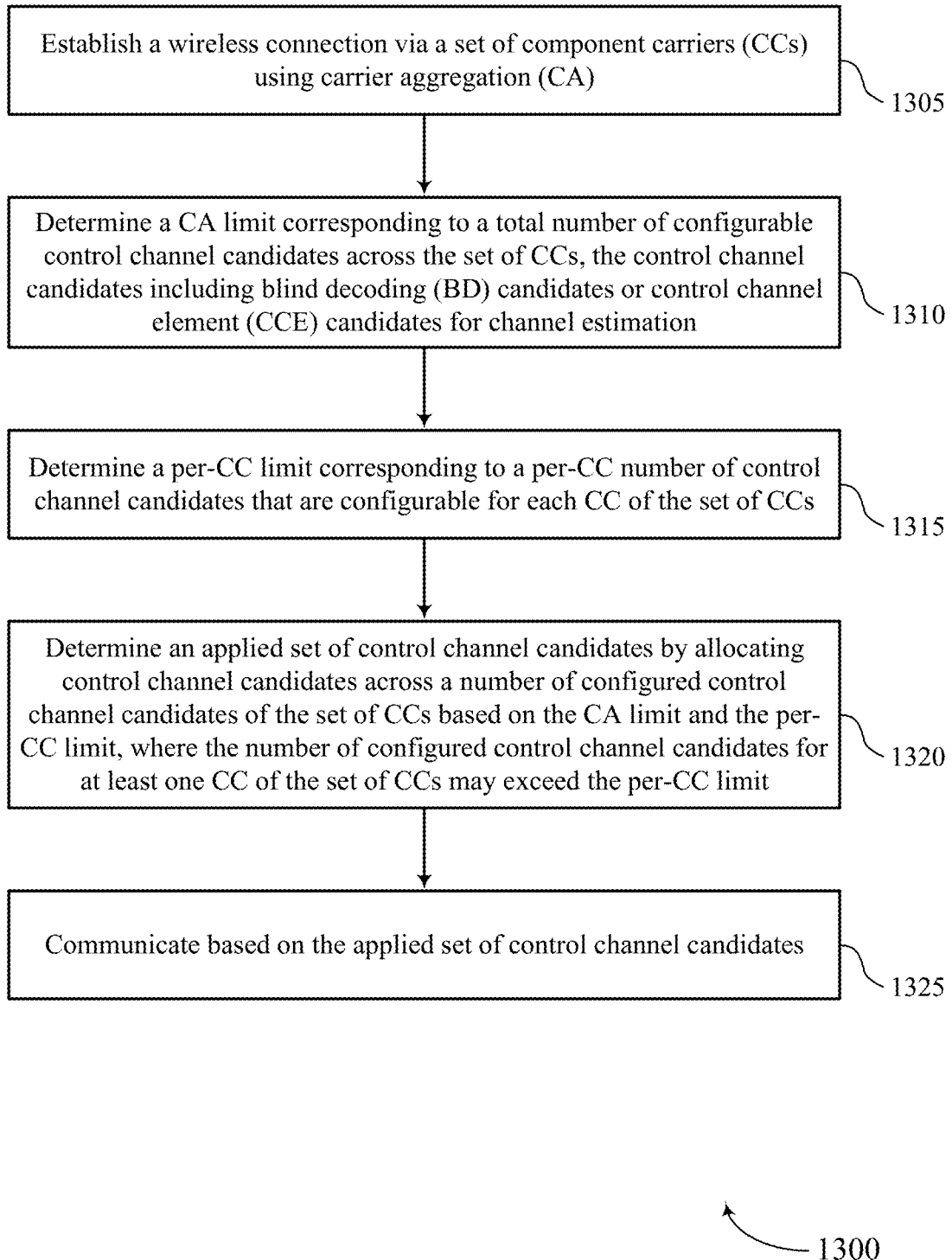
FIGS. 13 and 14 show flowcharts illustrating methods in accordance with aspects of the present disclosure.

FIG. 13 shows a flowchart illustrating a method 1300 that supports search space design with overbooking in carrier aggregation in accordance with aspects of the present disclosure. The operations of method 1300 may be implemented by a UE 115 or base station 105 or its components as described herein. For example, the operations of method 1300 may be performed by a communications manager as described with reference to FIGS. 8 through 12. In some examples, a UE or base station may execute a set of instructions to control the functional elements of the UE or base station to perform the functions described below. Additionally or alternatively, a UE or base station may perform aspects of the functions described below using special-purpose hardware.

At 1305, the UE or base station may establish a wireless connection via a set of CCs using CA. The operations of 1305 may be performed according to the methods described herein. In some examples, aspects of the operations of 1305 may be performed by a CA manager as described with reference to FIGS. 8 through 12.

At 1310, the UE or base station may determine a CA limit corresponding to a total number of configurable control channel candidates across the set of CCs, the control channel candidates including BD candidates or CCE candidates for channel estimation. The operations of 1310 may be performed according to the methods described herein. In some examples, aspects of the operations of 1310 may be performed by a CA limit component as described with reference to FIGS. 8 through 12.

At 1315, the UE or base station may determine a per-CC limit corresponding to a per-CC number of control channel candidates that are configurable for each CC of the set of CCs. The operations of 1315 may be performed according to the methods described herein. In some examples, aspects of the operations of 1315 may be performed by a CC limit component as described with reference to FIGS. 8 through 12.

At 1320, the UE or base station may determine an applied set of control channel candidates by allocating control channel candidates across a number of configured control channel candidates of the set of CCs based on the CA limit and the per-CC limit, where the number of configured control channel candidates for at least one CC of the set of CCs may exceed the per-CC limit. The operations of 1320 may be performed according to the methods described herein. In some examples, aspects of the operations of 1320 may be performed by a control channel candidate component as described with reference to FIGS. 8 through 12.

At 1325, the UE or base station may communicate based on the applied set of control channel candidates. The operations of 1325 may be performed according to the methods described herein. In some examples, aspects of the operations of 1325 may be performed by a CA manager as described with reference to FIGS. 8 through 12.

Figure 14:
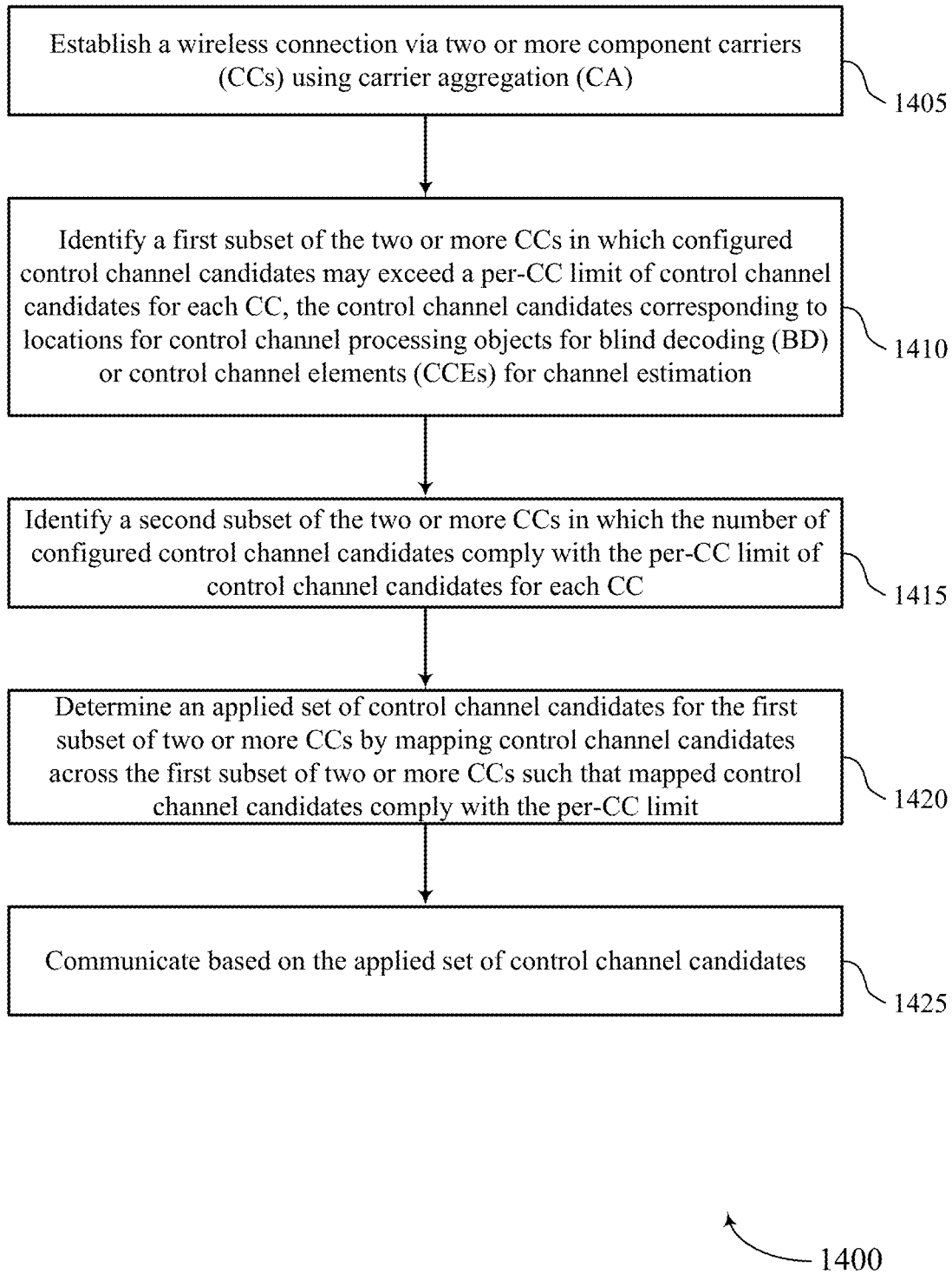

FIG. 14 shows a flowchart illustrating a method 1400 that supports search space design with overbooking in carrier aggregation in accordance with aspects of the present disclosure. The operations of method 1400 may be implemented by a UE 115 or base station 105 or its components as described herein. For example, the operations of method 1400 may be performed by a communications manager as described with reference to FIGS. 8 through 12. In some examples, a UE or base station may execute a set of instructions to control the functional elements of the UE or base station to perform the functions described below. Additionally or alternatively, a UE or base station may perform aspects of the functions described below using special-purpose hardware.

At 1405, the UE or base station may establish a wireless connection via two or more CCs using CA. The operations of 1405 may be performed according to the methods described herein. In some examples, aspects of the operations of 1405 may be performed by a CA manager as described with reference to FIGS. 8 through 12.

At 1410, the UE or base station may identify a first subset of the two or more CCs in which configured control channel candidates may exceed a per-CC limit of control channel candidates for each CC, the control channel candidates corresponding to locations for control channel processing objects for BD or CCEs for channel estimation. The operations of 1410 may be performed according to the methods described herein. In some examples, aspects of the operations of 1410 may be performed by a CC selection component as described with reference to FIGS. 8 through 12.

At 1415, the UE or base station may identify a second subset of the two or more CCs in which the number of configured control channel candidates comply with the per-CC limit of control channel candidates for each CC. The operations of 1415 may be performed according to the methods described herein. In some examples, aspects of the operations of 1415 may be performed by a CC selection component as described with reference to FIGS. 8 through 12.

At 1420, the UE or base station may determine an applied set of control channel candidates for the first subset of CCs by mapping control channel candidates across the first subset of CCs such that mapped control channel candidates comply with the per-CC limit. The operations of 1420 may be performed according to the methods described herein. In some examples, aspects of the operations of 1420 may be performed by a control channel candidate component as described with reference to FIGS. 8 through 12.

At 1425, the UE or base station may communicate based on the applied set of control channel candidates. The operations of 1425 may be performed according to the methods described herein. In some examples, aspects of the operations of 1425 may be performed by a CA manager as described with reference to FIGS. 8 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
    a memory; and
    at least one processor coupled to the memory, wherein the at least one processor is configured to:
    establish a wireless connection via a set of component carriers (CCs) based on carrier aggregation (CA), wherein the set of CCs includes at least a first CC that has a first sub-carrier spacing (SCS), and a second CC that has a second SCS that is different than the first SCS, wherein a CA limit corresponds to a total number of control channel candidates across the set of CCs, wherein a per-CC limit corresponds to a per-CC number of control channel candidates for each CC of the set of CCs;
    determine a set of control channel candidates from the total number of control channel candidates, wherein to determine the set of control channel candidates, the at least one processor is configured to allocate control channel candidates across the set of CCs based on the CA limit and the per-CC limit, wherein the set of control channel candidates includes blind decoding (BD) candidates or control channel element (CCE) candidates for channel estimation, wherein a number of configured control channel candidates for at least one CC of the set of CCs exceeds the per-CC limit; and
    communicate based on the set of control channel candidates.

2. The apparatus of claim 1, wherein, to allocate the control channel candidates across the set of CCs based on the CA limit and the per-CC limit, the at least one processor is configured to:
    allocate, based on the per-CC limit, the control channel candidates separately for each CC of the set of CCs.

3. The apparatus of claim 1, wherein a user equipment (UE) is capable to support a first number of CCs, wherein a second number of CCs in the set of CCs is less than or equal to the first number of CCs, and wherein the control channel candidates for each CC are separately allocated to each comply with the per-CC limit.

4. The apparatus of claim 1, wherein a user equipment (UE) is capable to support a first number of CCs, wherein a second number of CCs in the set of CCs is greater than the first number of CCs.

5. The apparatus of claim 4, wherein to determine the set of control channel candidates, the at least one processor is configured to:
    select a subset of CCs from the set of CCs, wherein the subset of CCs have a third number of CCs that correspond to the first number of CCs, and wherein, to allocate the control channel candidates across the set of CCs based on the CA limit and the per-CC limit, the at least one processor is configured to allocate, based on the per-CC limit, the control channel candidates across the subset of CCs.

6. The apparatus of claim 4, wherein the per-CC limit for each CC of the set of CCs is defined by a set of non-negative numbers such that the per-CC limit is a function of a non-negative number of the set of non-negative numbers, the first number of CCs, and a single carrier limit of control channel candidates for a single non-CA carrier, and the non-negative number is based on whether a BD limit budget or a CCE limit budget is distributed evenly, proportional to a bandwidth, or proportional to configured control channel candidates, for each CC.

7. The apparatus of claim 4, wherein to determine the set of control channel candidates, the at least one processor is configured to:
    distribute a BD limit budget or a CCE limit budget evenly across the second number of CCs, wherein a portion of the BD limit budget or the CCE limit budget for each CC corresponds to a product of the first number of CCs and the per-CC limit, the product divided by the second number of CCs.

8. The apparatus of claim 4, wherein to determine the set of control channel candidates, the at least one processor is configured to:
    distribute a BD limit budget or a CCE limit budget across the second number of CCs based on a bandwidth-proportional distribution, wherein a portion of the BD limit budget or the CCE limit budget for each CC corresponds to a product of the first number of CCs, the per-CC limit, and a bandwidth of an associated CC, divided by a total cumulative bandwidth of the second number of CCs.

9. The apparatus of claim 4, wherein to determine the set of control channel candidates, the at least one processor is configured to:
distribute a BD limit budget or a CCE limit budget across the second number of CCs based on a slot-based proportional distribution, wherein a portion of the BD limit budget or the CCE limit budget for each CC corresponds to a product of the first number of CCs, the per-CC limit, and a number of BDs or CCEs associated with configured control channel candidates of an associated CC for an associated slot, divided by a total cumulative number of configured control channel candidates of the second number of CCs.

10. The apparatus of claim 4, wherein to determine the set of control channel candidates, the at least one processor is configured to:
reduce a number of CCs of the set of CCs that can be scheduled with control channel transmissions to correspond to the second number of CCs, and distribute a BD limit budget or a CCE limit budget across configured control channel candidates of the reduced number of CCs; or
maintain the per-CC limit for a first subset of CCs, and distribute the control channel candidates among remaining CCs of the set of CCs that remain.

11. The apparatus of claim 1, wherein to determine the set of control channel candidates, the at least one processor is configured to:
identify a plurality of search space (SS) sets that indicate, for each CC of the set of CCs, associated resources for available control channel candidates; and
map the plurality of SS sets of each CC of the set of CCs up to the per-CC limit or until the control channel candidates of each CC are mapped to determine the set of control channel candidates for an associated CC, wherein each CC of the set of CCs has an ordered CC index, and wherein the at least one processor is configured to map from a lowest CC index to a highest CC index.

12. The apparatus of claim 1, wherein to determine the set of control channel candidates, the at least one processor is configured to:
identify a plurality of search space (SS) sets that each indicate associated resources for available control channel candidates for two or more CCs, wherein each CC set has a SS set index; and
map each CC associated with each SS set from the plurality of SS sets to determine the set of control channel candidates for an associated SS set, wherein a control channel candidate for a CC is skipped if the per-CC limit for the associated CC is reached or the CC is fully mapped, and wherein the at least one processor is configured to map from a lowest SS index to a highest SS index.

13. The apparatus of claim 1, wherein a user equipment (UE) is capable to support a first number of CCs, and wherein a second number of CCs in the set of CCs is greater than the first number of CCs, and wherein the at least one processor is further configured:
allocate control channel candidates jointly for the set of CCs, the control channel candidates for each CC allocated to comply with the per-CC limit, and the CA limit.

14. The apparatus of claim 13, wherein a number of CCs of the set of CCs that can be scheduled with control channel candidates is unknown until the joint allocation of the control channel candidates is finished.

15. The apparatus of claim 13, wherein, to allocate the control channel candidates, the at least one processor is configured to:
identify a plurality of search space (SS) sets that indicate, for each CC of the set of CCs, associated resources for available control channel candidates;
map the plurality of SS sets of each CC of the set of CCs up to the per-CC limit or until each CC is mapped to determine the set of control channel candidates for the associated CC, wherein each CC of the set of CCs has an ordered CC index, and wherein the at least one processor is configured to map from a lowest CC index to a highest CC index;
maintain a cumulative count of mapped control channel candidates across the set of CCs; and
stop the map if the cumulative count reaches the CA limit.

16. The apparatus of claim 13, wherein, to allocate the control channel candidates, the at least one processor is configured to:
identify a plurality of search space (SS) sets that each indicate associated resources for available control channel candidates for two or more CCs, wherein each CC set has a SS set index;
map each CC associated with each SS set to determine the control channel candidates of the set of control channel candidates for the associated SS set, wherein a control channel candidate for a CC is skipped if the per-CC limit for the associated CC is reached or the CC is fully mapped, and wherein the at least one processor is configured to map from a lowest SS index to a highest SS index;
maintain a cumulative count of mapped control channel candidates across the plurality of SS sets; and
stop the map if the cumulative count reaches the CA limit.

17. The apparatus of claim 1, wherein the first CC is a scheduling CC that provides scheduling information for each of the CCs of the set of CCs, and the first SCS is used to determine the CA limit for the scheduling CC, and each of the CCs of the set of CCs that is provided the scheduling information.

18. The apparatus of claim 1, wherein the first CC is a scheduling CC that provides scheduling information for the second CC, and the first SCS is used for the second CC to determine the set of control channel candidates.

19. The apparatus of claim 1, wherein to determine the set of control channel candidates, the at least one processor is configured to:
allocate a BD limit budget or a CCE limit budget separately for each CC of the set of CCs based on control channel candidates for each CC that are allocated to comply with the per-CC limit.

20. The apparatus of claim 1, wherein a user equipment (UE) is capable to support a first number of CCs, and wherein a second number of CCs in the set of CCs is greater than the first number of CCs, and wherein the at least one processor is further configured to:
identify the first SCS as a reference SCS, and a reference slot duration based on the reference SCS;
determine a second slot duration of the second CC based on the second SCS;
determine the per-CC limit of the second CC based on the second slot duration relative to the reference slot duration; and
allocate control channel candidates jointly for the set of CCs, the control channel candidates for each CC allocated to comply with the per-CC limit, and the CA limit.

21. The apparatus of claim 20, wherein, to allocate the control channel candidates, the at least one processor is configured to:
  count a number of control channel candidates for each reference slot duration for each CC;
  calculate a total number of control channel candidates for each CC in the reference slot duration; and
  allocate a plurality of BDs or CCEs to the total number of control channel candidates for each CC to comply with the per-CC limit, and the CA limit.

22. The apparatus of claim 21, wherein, to allocate the control channel candidates, the at least one processor is configured to:
  identify a plurality of search space (SS) sets that indicate, for each CC of the set of CCs, associated resources for available control channel candidates;
  map the plurality of SS sets of each CC of the set of CCs up to the per-CC limit or until the control channel candidates of each CC are mapped to determine the set of control channel candidates for the associated CC, wherein each CC of the set of CCs has an ordered CC index, and wherein the at least one processor is configured to map from a lowest CC index to a highest CC index;
  maintain a cumulative count of mapped control channel candidates across the set of CCs; and
  stop the map if the cumulative count reaches the CA limit.

23. The apparatus of claim 21, wherein, to allocate the control channel candidates, the at least one processor is configured to:
  identify plurality of search space (SS) sets that each indicates associated resources for available control channel candidates for two or more CCs, wherein each CC set has a SS set index;
  map each CC associated with each SS set to determine the set of control channel candidates for the associated SS set, wherein a control channel candidate for a CC is skipped if the per-CC limit for the associated CC is reached or the CC is fully mapped, and wherein the at least one processor is configured to map from a lowest SS index to a highest SS index;
  maintain a cumulative count of mapped control channel candidates across the plurality of SS sets; and
  stop the map if the cumulative count reaches the CA limit.

24. He apparatus of claim 21, wherein the first SCS is less than or equal to the second SCS, and the total number of control channel candidates for each CC in the reference slot duration is a summation of the number of control channel candidates in the second slot duration that overlaps with the reference slot duration.

25. The apparatus of claim 20, wherein the first SCS is smaller than the second SCS, the second SCS is the reference SCS, and a first slot duration of the first CC is longer than the reference slot duration, and a total number of control channel candidates for each CC in the reference slot duration is adjusted based on a portion of the first slot duration that overlaps with a subsequent reference slot duration.

26. An apparatus for wireless communication, comprising:
  a memory; and
  at least one processor coupled to the memory, wherein the at least one processor is configured to:
    establish a wireless connection via two or more component carriers (CCs) based on carrier aggregation (CA),
    wherein a first subset of the two or more CCs includes configured control channel candidates that exceed a per-CC limit of control channel candidates for each CC,
    wherein the control channel candidates correspond to locations for control channel processing objects for blind decoding (BD) or control channel elements (CCEs) for channel estimation,
    wherein a second subset of the two or more CCs includes a number of configured control channel candidates that comply with the per-CC limit of control channel candidates for each CC,
    wherein the first subset of the two or more CCs includes a primary component carrier (PCC), and a primary secondary component carrier (PSCC), and the second subset of the two or more CCs includes one or more secondary component carriers (SCCs),
    wherein control channel candidates are mapped across the first subset of two or more CCs such that mapped control channel candidates comply with the per-CC limit to determine a set of control channel candidates; and
    communicate based on the set of control channel candidates.

27. The apparatus of claim 26, wherein the number of configured control channel candidates complies with a CA limit of control channel candidates for the two or more CCs.

28. The apparatus of claim 26, wherein the two or more CCs includes at least a first CC that has a first sub-carrier spacing (SCS), and a primary secondary component carrier (PSCC), and a second CC that has a second SCS that is different than the first SCS.

29. A method for wireless communication, comprising:
  establishing a wireless connection via a set of component carriers (CCs) using carrier aggregation (CA),
  wherein the set of CCs includes at least a first CC having a first sub-carrier spacing (SCS), and a second CC having a second SCS that is different than the first SCS,
  wherein a CA limit corresponds to a total number of control channel candidates across the set of CCs,
  wherein a per-CC limit corresponds to a per-CC number of control channel candidates for each CC of the set of CCs;
  determining a set of control channel candidates from the total number of control channel candidates, wherein to determine the set of control channel candidates, control channel candidates are allocated across the set of CCs based on the CA limit and the per-CC limit,
  wherein the set of control channel candidates includes blind decoding (BD) candidates or control channel element (CCE) candidates for channel estimation,
  wherein a number of configured control channel candidates for at least one CC of the set of CCs exceeds the per-CC limit; and
  communicating based on the set of control channel candidates.

30. A method for wireless communication, comprising:
  establishing a wireless connection via two or more component carriers (CCs) using carrier aggregation (CA),
  wherein a first subset of the two or more CCs includes configured control channel candidates exceeding a per-CC limit of control channel candidates for each CC,
  wherein the control channel candidates correspond to locations for control channel processing objects for blind decoding (BD) or control channel elements (CCEs) for channel estimation, wherein a second subset of the two or more CCs includes a number of configured control channel candidates complying with the per-CC limit of control channel candidates for each CC, wherein the first subset of the two or more CCs includes a primary component carrier (PCC), and a primary secondary component carrier (PSCC), and the second subset of the two or more CCs includes one or more secondary component carriers (SCCs), wherein control channel candidates are mapped across the first subset of two or more CCs such that mapped control channel candidates comply with the per-CC limit to determine a set of control channel candidates; and communicating based on the control channel candidates of the set of control channel candidates.

* * * * *